United States Patent
Graham et al.

(10) Patent No.: US 9,411,654 B2
(45) Date of Patent: Aug. 9, 2016

(54) MANAGING CONFIGURATION AND OPERATION OF AN ADAPTER AS A VIRTUAL PERIPHERAL COMPONENT INTERCONNECT ROOT TO EXPANSION READ-ONLY MEMORY EMULATION

(75) Inventors: Charles S. Graham, Rochester, MN (US); Gregory M. Nordstrom, Pine Island, MN (US); John R. Oberly, III, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 616 days.

(21) Appl. No.: 13/328,671

(22) Filed: Dec. 16, 2011

(65) Prior Publication Data

US 2013/0159686 A1 Jun. 20, 2013

(51) Int. Cl.
*G06F 13/14* (2006.01)
*G06F 9/50* (2006.01)
*G06F 9/455* (2006.01)

(52) U.S. Cl.
CPC .... G06F 9/5077 (2013.01); *G06F 2009/45579* (2013.01)

(58) Field of Classification Search
CPC ...................... G06F 9/45558; G06F 2213/0026
See application file for complete search history.

(56) References Cited

U.S. PATENT DOCUMENTS

| | | | |
|---|---|---|---|
| 6,035,346 A | 3/2000 | Chieng et al. | |
| 6,330,656 B1 | 12/2001 | Bealkowski et al. | |
| 7,120,778 B2 * | 10/2006 | Zimmer | 711/202 |
| 7,743,189 B2 | 6/2010 | Brown et al. | |
| 7,873,068 B2 | 1/2011 | Klinglesmith et al. | |
| 7,934,033 B2 | 4/2011 | Malwankar et al. | |
| 7,979,592 B1 | 7/2011 | Pettey et al. | |
| 2003/0217168 A1* | 11/2003 | Adachi | H04L 29/06 709/229 |
| 2004/0181625 A1 | 9/2004 | Armstrong et al. | |
| 2005/0223145 A1 | 10/2005 | Lin et al. | |
| 2006/0154725 A1 | 7/2006 | Glaser et al. | |
| 2006/0253619 A1* | 11/2006 | Torudbakken et al. | 710/31 |
| 2007/0011491 A1 | 1/2007 | Govindarajan et al. | |
| 2008/0147898 A1 | 6/2008 | Freimuth et al. | |
| 2008/0168461 A1 | 7/2008 | Arndt et al. | |
| 2008/0216085 A1 | 9/2008 | Arndt et al. | |
| 2008/0270735 A1 | 10/2008 | Arndt et al. | |
| 2009/0089464 A1 | 4/2009 | Lach et al. | |
| 2009/0144731 A1 | 6/2009 | Brown et al. | |

(Continued)

FOREIGN PATENT DOCUMENTS

TW 200925878 6/2009

OTHER PUBLICATIONS

Intel, Inc.; "PCI-SIG Single Root I/O Virtualization (SRIOV) Support in Intel Virtualization Technology for Connectivity"; www.intel.dk/jp/software . . . ; 2008.

(Continued)

*Primary Examiner* — Henry Tsai
*Assistant Examiner* — Juanito Borromeo
(74) *Attorney, Agent, or Firm* — Toler Law Group, P.C.

(57) ABSTRACT

A method of managing an adapter includes identifying a firmware image configured to enable configuration firmware of a logical partition, where the firmware image is associated an expansion read-only memory (ROM). Access to the firmware image may be enabled by the logical partition, and the firmware image may be used to control of an operation of the adapter.

22 Claims, 16 Drawing Sheets

(56) References Cited

U.S. PATENT DOCUMENTS

| | | | |
|---|---|---|---|
| 2009/0187694 | A1 | 7/2009 | Baba et al. |
| 2009/0249300 | A1 | 10/2009 | Vainer et al. |
| 2009/0249330 | A1 | 10/2009 | Abercrombie et al. |
| 2009/0276551 | A1 | 11/2009 | Brown et al. |
| 2009/0276773 | A1* | 11/2009 | Brown et al. ............... 718/1 |
| 2009/0276775 | A1 | 11/2009 | Brown et al. |
| 2010/0153592 | A1 | 6/2010 | Freimuth et al. |
| 2010/0232443 | A1 | 9/2010 | Pandey |
| 2010/0251391 | A1 | 9/2010 | Adrangi |
| 2010/0290467 | A1 | 11/2010 | Eisenhauer et al. |
| 2011/0179413 | A1 | 7/2011 | Subramanian et al. |
| 2011/0202702 | A1 | 8/2011 | Fan et al. |
| 2012/0089864 | A1 | 4/2012 | Tanaka et al. |
| 2012/0096192 | A1 | 4/2012 | Tanaka et al. |
| 2012/0151472 | A1 | 6/2012 | Koch et al. |
| 2013/0111082 | A1 | 5/2013 | Baba et al. |
| 2013/0159572 | A1 | 6/2013 | Graham et al. |
| 2013/0160001 | A1 | 6/2013 | Graham et al. |
| 2013/0160002 | A1 | 6/2013 | Graham et al. |

OTHER PUBLICATIONS

Emulex; "Optimizing Virtualized Servers with SR-IOV"; whitepaper; www.emulex.com/artifacts/885edbe . . . ; 2010.

Red Hat, Inc.; "SR-IOV Performance Advantage: Red Hat Enterprise Linux 6 improved virtualized database performance over 23 percent," A Principled Technologies Test Report; www.principledtechnologies.com/RedHat; Nov. 2010.

Gaihong Lian et al.; "Research and implementation of heterogeneous data sharing"; IEEE Intern'l Conference on Computer Mechatronics, Control & EE(CMCE2010); 2010.

Ben-Ami Yassour et al.; "On the DMA Mapping Problem in Direct Device Assignment"; SYSTOR 2010 Proceedings of the 3rd Annual Haifa Experimental Systems Conf; May 2010.

Charles S. Graham et al., U.S. Appl. No. 13/328,535 entitled "Managing Configuration and System Operations of a Non-Shared Virtualized Input/Output Adapter as Virtual Peripheral Component Interconnect Root to Single Function Hierarchies," filed Dec. 16, 2011.

Charles S. Graham et al., U.S. Appl. No. 13/328,595 entitled "Managing Configuration and System Operations of a Shared Virtualized Input/Output Adapter as Virtual Peripheral Component Interconnect Root to Single Function Hierarchies," filed Dec. 16, 2011.

Charles S. Graham et al., U.S. Appl. No. 13/328,640 entitled "Managing Configuration and System Operations of a Non-Shared Virtualized Input/Output Adapter as Virtual Peripheral Component Interconnect Root to Multi-Function Hierarchies," filed Dec. 16, 2011.

International Search Report and Written Opinion of the ISA dated Dec. 11, 2012—International Application No. PCT/US2012/059686.

International Search Report dated Dec. 11, 2012, International Application No. PCT/US2012/059685, 2 pages.

International Search Report dated Dec. 21, 2012, International Application No. PCT/US2012/059684, 2 pages.

International Search Report dated Dec. 7, 2012, International Application No. PCT/US2012/059418, 2 pages.

U.S. Appl. No. 13/328,535; Non-Final Office Action dated Mar. 24, 2014; 37 pages.

U.S. Appl. No. 13/328,595, Non-Final Office Action dated Mar. 24, 2014, 26 pages.

U.S. Appl. No. 13/328,640; Non-Final Office Action dated Jun. 3, 2014; 24 pages.

Lowe, S., "What is SR-IOV?" Dec. 2, 2009, accessed at blog.scottlowe.org/2009/12/02/what-is-sr-iov, 9 pages.

U.S. Appl. No. 13/328,535, Final Office Action dated Aug. 14, 2014, 27 pages.

U.S. Appl. No. 13/328,595; Final Office Action dated Aug. 8 2014; 22 pages.

U.S. Appl. No. 13/328,595; Non-Final Office Action dated Dec. 11, 2014; 19 pages.

U.S. Appl. No. 13/328,535; Non-Final Office Action dated Dec. 12, 2014; 16 pages.

U.S. Appl. No. 13/328,640; Final Office Action dated Dec. 18, 2014; 13 pages.

\* cited by examiner

MANAGING CONFIGURATION AND OPERATION OF AN ADAPTER AS A VIRTUAL PERIPHERAL COMPONENT INTERCONNECT ROOT TO EXPANSION READ-ONLY MEMORY EMULATION

I. FIELD OF THE DISCLOSURE

The present disclosure relates generally to computer systems, and more particularly, to managing virtual functions that are hosted by a virtualized input/output (I/O) adapter.

II. BACKGROUND

Single Root I/O Virtualization (SR-IOV) is a specification that allows a Peripheral Component Interconnect Express (PCIe) device to appear to be multiple separate physical PCIe devices. SR-IOV enables a virtualization intermediary (VI), such as a hypervisor or virtual input/output (I/O) server operating system, to configure an I/O adapter into a number of virtual functions (VFs). The virtual functions may be assigned to different operating system images (OSIs), or logical partitions (LPARs).

The virtual functions belong to a PCI hierarchy and are of a device type that may be undefined in operating system and system firmware. Configuration of the virtual functions may require significant administrator man-hours and system downtime. Association and management of the virtual functions with a PCI adapter or slot location that is subject to PCI adapter maintenance and administrative operations, such as adapter hot plug and dynamic assignment to or from logical partitions, may be undefined in operating systems and system firmware.

III. SUMMARY

In a particular embodiment, a computer implemented method of managing an adapter includes identifying a firmware image configured to enable configuration firmware of a logical partition, where the firmware image is associated an expansion read-only memory (ROM). Access to the firmware image may be enabled by the logical partition, and the firmware image may be used to control of an operation of the adapter.

In another particular embodiment, an apparatus includes an adapter, a processor, and a memory storing program code, the program code executable by the processor to identify a firmware image configured to enable configuration firmware of a logical partition, where the firmware image is associated an expansion read-only memory (ROM). Access to the firmware image may be enabled by the logical partition, and the firmware image may be used to control of an operation of the adapter.

In another particular embodiment, a computer program product includes a computer usable medium having computer usable program code embodied therewith. The computer usable program code may be executable by a processor to identify a firmware image configured to enable configuration firmware of a logical partition, where the firmware image is associated an expansion read-only memory (ROM). Access to the firmware image may be enabled by the logical partition, and the firmware image may be used to control of an operation of the adapter.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

IV. BRIEF DESCRIPTION OF THE DRAWINGS

V. DETAILED DESCRIPTION

Figure 1:
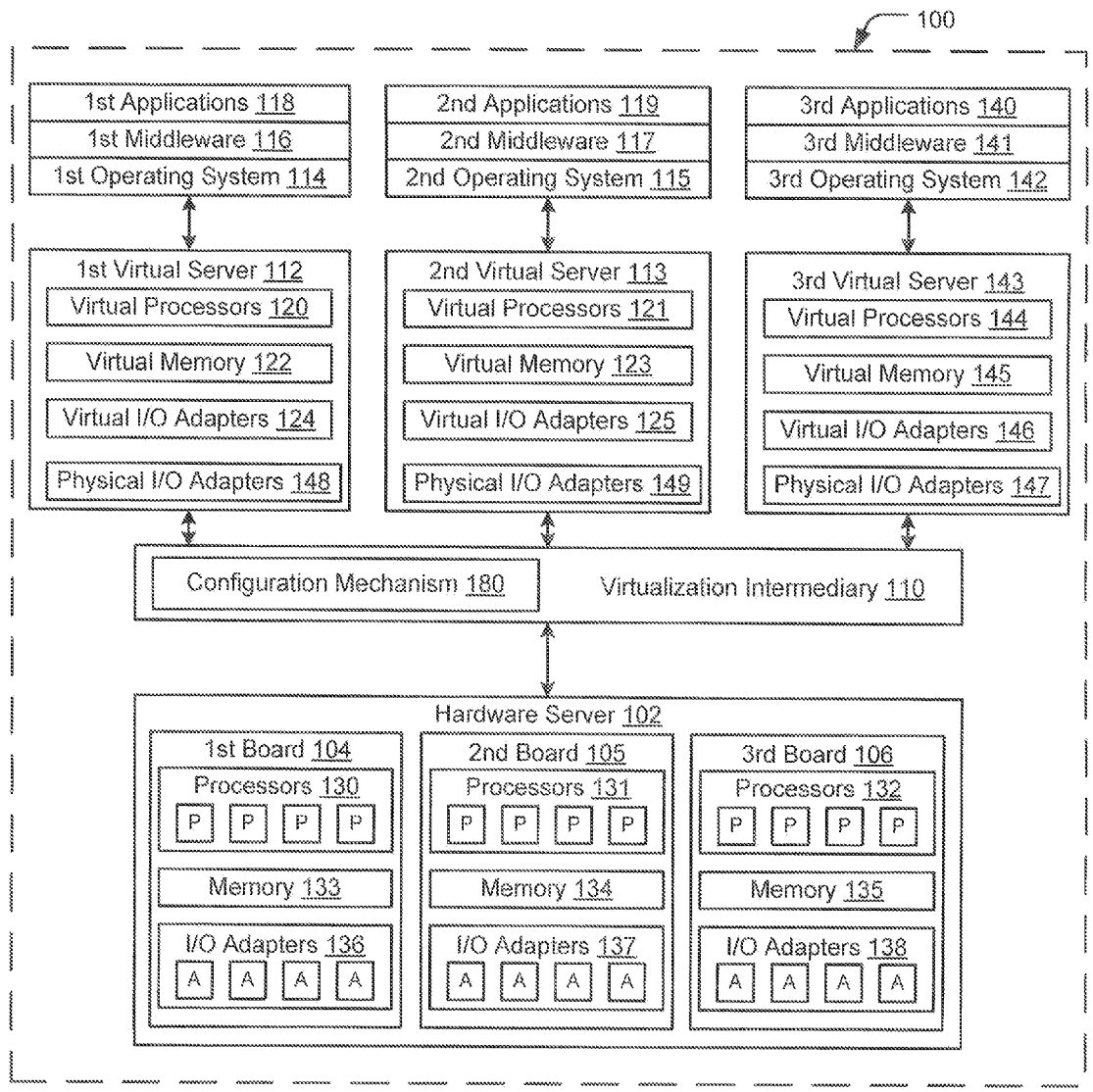
FIG. 1 is a block diagram of a first embodiment of a system to manage a configuration space of an I/O adapter.

In a virtualized computer system, a hardware input/output (I/O) adapter may be capable of providing virtual functions to multiple logical partitions. For example, the hardware I/O adapter may be a single root input/output virtualized (SR-IOV) adapter or a multiple root input/output virtualized (MR-IOV) adapter. A virtualization intermediary (VI), such as a hypervisor, a hosting operating system, or other firmware or software entity within a virtualized computer system acting as a virtualization management agent, may manage the execution of the multiple logical partitions and assign one or more of the virtual functions to particular logical partitions to enable the logical partitions to perform I/O operations.

Each virtual function may have an associated configuration space that is located at a memory of the hardware I/O adapter. The configuration space may include a read-only portion and a read-write portion. For example, the read-only portion may provide information associated with the virtual function, such as a device identifier and a vendor identifier, and information associated with the hardware I/O adapter, such as a number of ports of the hardware I/O adapter and an arrangement of the ports. The read-write portion may include parameters that can be configured (e.g., by a logical partition or by an application executing in the logical partition), such as enabling/disabling memory-mapped I/O (MMIO), enabling/disabling direct memory access (DMA), setting a maximum link speed, enabling/disabling advanced error handling, setting another virtual function parameter or any combination thereof. In a particular embodiment, the configuration space may include one or more registers, such as read-only registers and read-write registers.

The virtualization intermediary may provide an access mechanism to enable a logical partition to access the configuration space that is associated with the virtual function that is assigned to the logical partition. The access mechanism provided by the virtualization intermediary may be a high-level access mechanism that uses lower-level access mechanisms to access the configuration space of each virtual function. For example, the access mechanism provided by the virtualization intermediary may call a configuration space access mechanism of a root complex, an adapter provided configuration mechanism, another access mechanism, or any combination thereof.

A particular embodiment facilitates the implementation and application of Peripheral Component Interconnect Express (PCIe) Single Root I/O Virtualization (SR-IOV) adapter by presenting the SR-IOV adapter and associated virtual functions to system components in a manner that avoids change to the system components. Illustrative such system components may be outside of the virtualization intermediary, such as system or platform management systems, operating systems, system firmware, and I/O device drivers. The virtualization intermediary may detect and initialize physical functions and virtual functions correctly and appropriately.

An embodiment enables a virtualization intermediary to present and operate SR-IOV adapters and virtual functions within system management, operating system, and system firmware components in a manner that substantially conforms to that of non-SR-IOV PCI adapters. SR-IOV technology may be adapted to operating systems and firmware that already support PCI-e adapters in an automatic and inexpensive manner.

An SR-IOV adapter may be virtualized to be shared by multiple OSIs/LPARs within a logically partitioned environment, or may be assigned to one OSI/LPAR as a dedicated adapter. In the shared case, a virtualization intermediary may configure the adapter in SR-IOV-enabled mode and make individual virtual functions available for assignment to an individual operating system or logical partition.

PCI devices may be used by firmware to load an operating system's boot image. A boot image may be loaded in memory from a disk connected directly to the system or connected by a storage network. The boot image may also be loaded via a general data network using the Bootstrap Protocol (BOOTP) or Trivial File Transfer Protocol (TFTP). To this end, a PCI device may provide a boot time driver (e.g., OpenFirmware FCode, EFI Byte Code, etc.) that may be used by firmware (e.g., OpenFirmware, EFI, BIOS, etc.) to operate the device to load the boot image.

A boot time driver of a PCI device may be obtained from the expansion read-only memory (ROM) of the PCI device. The expansion ROM is memory mapped as any other PCI MMIO region through a base address register (BAR). The expansion ROM is accessed via MMIO to obtain the appropriate driver. PCI SR-IOV enables a virtualization intermediary (VI), such as a hypervisor or virtual I/O server operating system, to configure a PCI adapter into a number of virtual functions (VFs) that can then be assigned to different operating system images (OSIs), or logical partitions (LPARs). However, PCI SR-IOV does not define an Expansion ROM BAR for virtual functions. In order for logical partition firmware, or configuration firmware, to obtain an appropriate boot time driver of a logical partition, the expansion ROM area must be emulated by the virtualization intermediary. Furthermore, no driver in the physical expansion ROM may match the PCI IDs for the virtual function, so the image may need to be emulated to allow configuration firmware to read a virtualized expansion ROM for a virtual function and to find an image that matches the PCI configuration IDs of the virtual function as virtualized by the virtualization intermediary.

Where the physical function (PF) expansion ROM includes an image appropriate for its virtual functions, the PCIM may leave the expansion ROM mapped and provide the mapped address to the logical partition/configuration firmware to directly access a virtual function's parent physical function expansion ROM. However, it may be desirable to separate the physical function and virtual function MMIO regions to create error isolation between the physical function accessed by the PCIM and the virtual function accessed by the logical partition, requiring the PCIM to create a virtualized expansion ROM image to be used by logical partition owning the virtual function. The virtualization intermediary may require the PCIM to limit the size of the virtualized image to save memory space, so the PCIM may need to filter firmware images from the expansion ROM to those needed for virtual functions and supported by the system architecture.

An embodiment of a method may virtualize the PCI expansion ROM and PCI firmware image to enable configuration firmware, or partition firmware, to load a boot time driver of a virtual function when a virtualization intermediary presents a virtual function to firmware as a single-function PCI device.

A first aspect of an embodiment may determine an appropriate PCI firmware image of an expansion ROM from each physical function that is needed by the child virtual function(s) of the physical function(s). A second aspect of an embodiment may provide an access mechanism to a partition in order to access the appropriate expansion ROM image. The expansion ROM image may be a virtualized image or pass-through access to the virtual function's parent physical function Expansion ROM.

A virtualized, in-memory expansion ROM image may be created using PCI firmware images across any of the physical functions of the adapter. The ROM images may be restructured using the PCI firmware specification to create a single expansion ROM image. The image may include PCI firmware images needed by virtual functions. The image may be used by the operating system images supported by the system architecture and the virtualization intermediary. A physical function expansion ROM image may be mapped into PCI memory space by the PCIM. The image may be accessed directly by a logical partition.

Platform architecture or function isolation requirements may dictate whether the PCIM should create a virtualized in-memory expansion ROM image for virtual functions to access, or map each expansion ROM BAR into PCI address space for pass-through access from each logical partition owning a virtual function to the parent physical function expansion ROM of the virtual function.

A virtualized expansion ROM image may be created by searching through each SR-IOV capable physical function for the PCI firmware images needed for that physical function's virtual functions that are also compatible with the operating system images supported by the virtualization intermediary. For each of the PCI firmware images, the PCIM may modify the PCI header and may add the image to with the modified header to create a new in-memory expansion ROM image that complies with the PCI firmware specification.

The virtualized expansion ROM image may then be copied to the virtualization intermediary for presentation to each logical partition that owns one of the virtual functions. Alternatively, virtualized images may be created and used for one or more virtual functions. When each virtual function is configured in the virtualization intermediary, the image to be used for each virtual function may identified to the virtualization intermediary, to be later presented to the virtual function's client logical partition. If the latter option of pass-through access to the physical function's Expansion ROM is appropriate, the PCIM may map an expansion ROM BAR of each SR-IOV capable physical function into PCI address space. The PCIM may further provide the address to the virtualization intermediary for each physical function.

Alternatively, the appropriate mapped expansion ROM address may be provided to the virtualization intermediary for each virtual function as those virtual functions are configured. For instance, the first physical function may provide an appropriate expansion ROM image with PCI firmware images for any virtual function configured on any physical function on the SR-IOV adapter. The expansion ROM image of the first physical function may be mapped into PCI address space, and the address could be used for each virtual function.

A logical partition may access the expansion ROM image using various methods in accordance with different embodiments. For example, the virtualization intermediary may provide an address and size of the expansion ROM image to the logical partition. The address may be used to map the expansion ROM image directly into the memory space of the logical partition. According to another embodiment, the virtualization intermediary may present a special interface (e.g., system call, hypervisor call, etc.) to allow the logical partition to read the virtual function's expansion ROM image of the virtual function (and to determine the size of the ROM image) without an address.

Where an address based mechanism (e.g., the first embodiment) is used to provide a logical partition with access to the expansion ROM image of the virtual function, a logical partition may obtain the address using various processes or combination of processes. In a first example, the virtualization intermediary may present the address and size of an expansion ROM image of a virtual function to a logical partition via an in-memory data structure copied to the memory space of the logical partition prior to starting the logical partition. In another example, the virtualization intermediary may intercept calls from the logical partition/configuration firmware to the virtualization intermediary to read the PCI configuration Expansion ROM BAR and to provide an address. The address may be assigned by the virtualization intermediary for the virtualized, in-memory expansion ROM image, or for a PCI address mapped by the PCIM.

The configuration firmware may map the expansion ROM image address directly into logical partition memory space for access without use of a call to the virtualization intermediary. If a virtualized, in-memory expansion ROM image is being used, the virtualization intermediary may intercept the initial call to map the expansion ROM into logical partition memory space. The virtualization intermediary may instead map the logical partition address to virtualization intermediary memory containing the virtualized image for read-only access.

Alternatively, logical partition firmware may use a special call to the virtualization intermediary with the given address to access the Expansion ROM image. The virtualization intermediary may intercept the read of the image when the address indicates to the virtualization intermediary that it is for a virtualized, in-memory Expansion ROM image, and respond to the call with the appropriate data from the in-memory image. When using a physical function's physical Expansion ROM image, the logical partition may map the address normally as any other PCI address, for read-only access, to logical partition memory space. Configuration firmware may then read from the mapped address through to the physical expansion ROM of the physical function.

In the case of a dedicated (e.g., non-shared) operating system, the operating system may desire to use the adapter in legacy mode. In legacy mode, the SR-IOV capabilities may not be enabled or used. Another legacy mode scenario may include an adapter enabled for SR-IOV and an operating system that implements a single device driver for the virtual function (or for each virtual function of a plurality of multiple functions). The device driver arrangement may avoid development of a more complex device driver that encompasses both virtual function and adapter physical and management functions.

Where a platform management administers logical partitions and shares SR-IOV adapters as individual virtual functions, an SR-IOV-enabled adapter may be dedicated to a single operating system or logical partition by assigning all of the adapter virtual functions to the operating system or logical partition. This dedicated assignment may allow the operating system or logical partition to provide a virtual function device driver and may delegate the larger adapter configuration and management or service functions to the platform management and virtualization intermediary.

A computing system that is not under such a partition management agent (i.e., a non-managed system) may inherit ownership of all of the PCI devices. The operating system and system firmware may perform all adapter configuration and management operations. The operating system may provide device driver resources to manage the adapter, whether virtualized or not. Further, an operating system may desire to use a non-shared adapter in a legacy mode, i.e., without SR-IOV being enabled. Other operating system instances running on the same logically partitioned system may desire to use the adapter in a non-shared, virtualized mode (e.g., SR-IOV-enabled) when ownership of the adapter is transferred to the operating system or logical partition. An embodiment may enable an SR-IOV adapter to be assigned to, or on a non-managed system to default to be owned by, an operating system or logical partition as wholly owned by that operating system or logical partition in either a virtualized or non-virtualized mode. According to an embodiment, the virtualization intermediary automatically and selectively translates between an SR-IOV function to an emulated PCI-standard function to enable control by the operating system.

Referring to FIG. 1, a block diagram of a first embodiment of a system having functions hosted by an input/output adapter is depicted and generally designated 100. The system may use a virtualization intermediary 110 to selectively and automatically correlate SR-IOV virtual functions to non-SR-IOV functions, such as PCI-standard functions.

More particularly, the system 100 may include a hardware server 102 that is managed by the virtualization intermediary 110, such as a hypervisor. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and input/output (I/O) adapters 136-138. Each of the boards 104-106 may include additional hardware resources (not shown), such as specialized processors (e.g., digital signal processors, graphics processors, etc.), disk drivers, other types of hardware, or any combination thereof. The processors 130-132, the memory 133-135, and the I/O adapters 136-138 of the hardware server 102 may be managed by the virtualization intermediary 110. Each processor of the processors 130-132 may be a simultaneous multithreading (SMT)-capable processor that is capable of concurrently executing multiple different threads.

The virtualization intermediary 110 may create and manage logical partitions, such as virtual servers 112, 113, 143. A logical partition may be a subset of the resources of the hardware server 102 that is virtualized as a separate virtual server. Each of the virtual servers 112, 113, 143 may have its own set of virtual resources, similar to a physical server. For example, the first virtual server 112 may include virtual processors 120, virtual memory 122, and virtual I/O adapters 124. The second virtual server 113 may include virtual processors 121, virtual memory 123, and virtual I/O adapters 125. The second virtual server 143 may include virtual processors 143, virtual memory 145, and virtual I/O adapters 146. The virtualization intermediary 110 may map the hardware of the hardware server 102 to the virtual servers 112, 113, 143. For example, the processors 130-132 may be mapped to the virtual processors 120, 121; the memory 133-135 may be mapped to the virtual memory 122, 123, and the I/O adapters 136-138 may be mapped to the virtual I/O adapters 124-125. Each of the virtual servers 112, 113, 143 may include a physical I/O adapter 147-149. The physical I/O adapters 147-149 may correspond to I/O adapters 136-138. The virtualization intermediary 110 may manage the selection of portions of the hardware server 102 and their temporary assignment to portions of the virtual servers 112, 113, including assignment of one or a plurality of physical adapters 136-138 to one virtual server.

The virtualization intermediary 110 may provide a configuration mechanism 180 to configure and manage a PCI hierarchy that includes a PCI host bridge and virtual functions. SR-IOV virtual functions may be presented to an operating system 114, 115 as non-IOV functions of a PCI multi-function device. According to another embodiment, the configuration mechanism 180 may not configure the adapters 136-138 in SR-IOV mode, and may instead allow the operating system 114, 115 to operate the adapters 136-138 as legacy PCI adapters.

Figure 2:
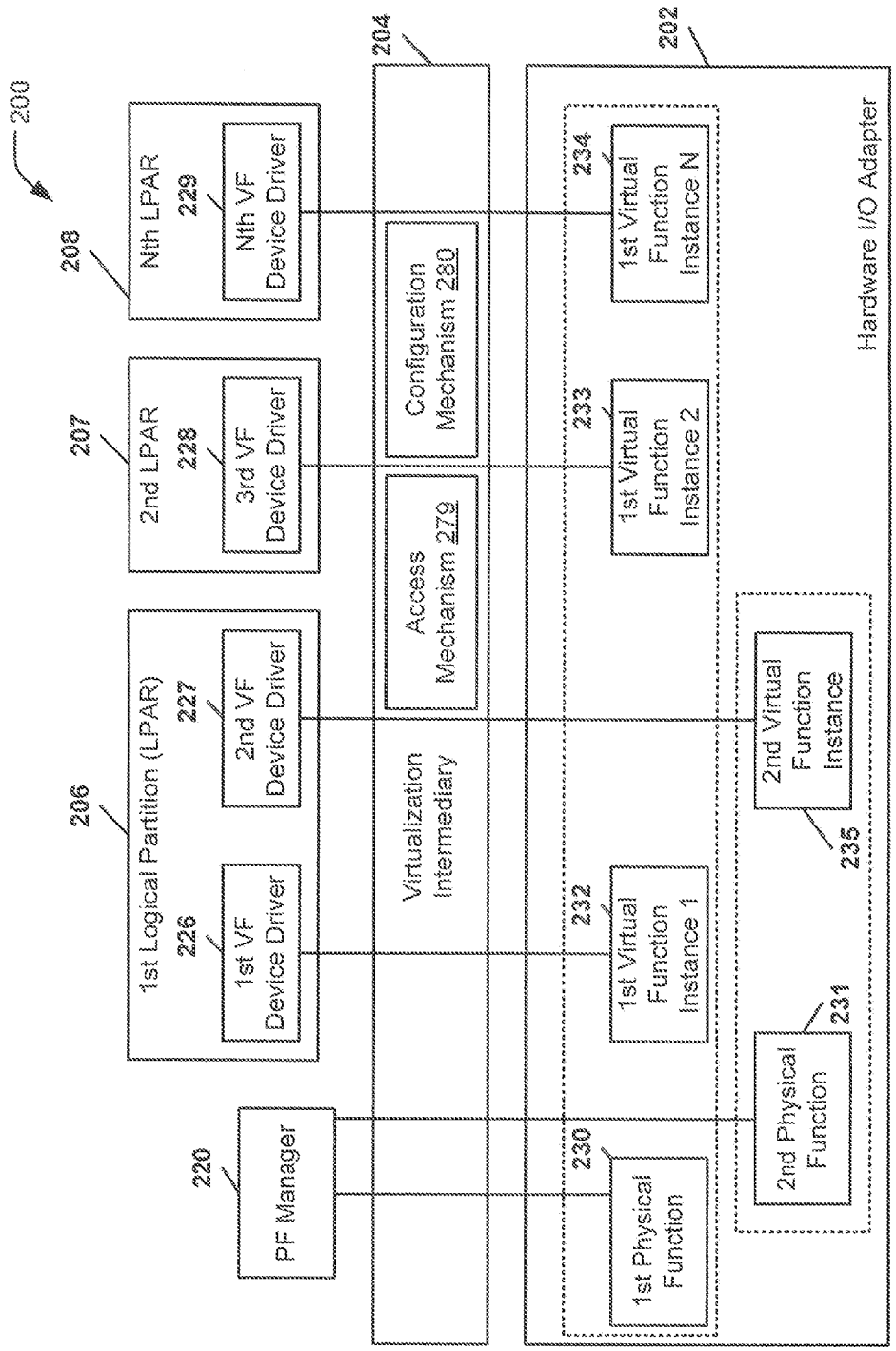
FIG. 2 is a block diagram of a second embodiment of a system to manage a configuration space of an I/O adapter.

Referring to FIG. 2, a block diagram of a second embodiment of a system to manage functions hosted on an I/O adapter is depicted and generally designated 200. In the system 200, a hypervisor, or other virtualization intermediary 204, may enable multiple logical partitions to access virtual functions provided by hardware that includes a hardware I/O adapter 202. For example, the virtualization intermediary 204 may enable a first logical partition 206, a second logical partition 207, and an $N^{th}$ logical partition 208, to access virtual functions 232-235 that are provided by the hardware I/O adapter 202. To illustrate, the virtualization intermediary 204 may use a first physical function 230 of the hardware I/O adapter 202 to provide a first instance of a first virtual function 232, a second instance of a first virtual function 233, and an $N^{th}$ instance of a first virtual function 234 to the logical partitions 206-208. The virtualization intermediary 204 may use a second physical function 231 of the hardware I/O adapter 202 to provide a second virtual function 235 to the logical partitions 206-208.

The physical functions 230, 231 may include PCI functions that support single root I/O virtualization capabilities. Each of the virtual functions 232-235 may be associated with one of the physical functions 230, 231 and may share one or more physical resources of the hardware I/O adapter 202.

Software modules, such as a physical function (PF) manager 220, may assist the virtualization intermediary in managing the physical functions 230, 231 and the virtual functions 232-235. For example, a user may specify a particular configuration and the PF manager 220 may configure the virtual functions 232-235 from the physical functions 230, 231 accordingly.

In operation, the PF manager 220 may enable the first virtual function instances 232-234 from the first physical function 230. The PF manager 220 may enable the second virtual function 235 from the second physical function 231. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/O 226, and a second client application executing at the first logical partition 206 may include a second client virtual I/O 227. The first client virtual I/O 226 may access the first instance of the first virtual function 232. The second client virtual I/O 227 may access the second virtual function 235. A third client virtual I/O 228 executing at the second logical partition 207 may access the second instance of the first virtual function 233. An $N^{th}$ client virtual I/O 229 executing at the $N^{th}$ logical partition 208 may access the $N^{th}$ instance of the first virtual function 233.

The virtualization intermediary 204 may assign the first instance of the first virtual function 232 and the first instance of the second virtual function 235 to the first logical partition 206. The virtualization intermediary 204 may provide the first logical partition 206 with two tokens (not shown), such as a first token and a second token, to enable the first logical partition 206 to access the virtual functions 232 and 235. The token may include a group identifier that identifies a physical slot location of the hardware I/O adapter 202 that hosts the virtual functions 232 and 235. The hardware I/O adapter 202 that hosts the virtual functions 232 and 235 may be moved from a first physical slot location to a second physical slot location. After the move, the virtualization intermediary 202 may associate the group identifier with the second physical slot location to enable the virtual functions 232 and 235 to be provided to the first logical partition 206.

It will be appreciated by one skilled in the art that the present invention is equally suited to embodiments that do not utilize a virtual function (VF) manager and client virtual I/O to enable a logical partition to access a virtual function, and instead enable a device driver within a logical partition to directly manage the virtual function. The virtualization intermediary 204 may provide a configuration mechanism 280 to selectively and automatically associate SR-IOV virtual functions with non-SR-IOV functions, such as PCI-standard functions virtual functions.

Figure 3:
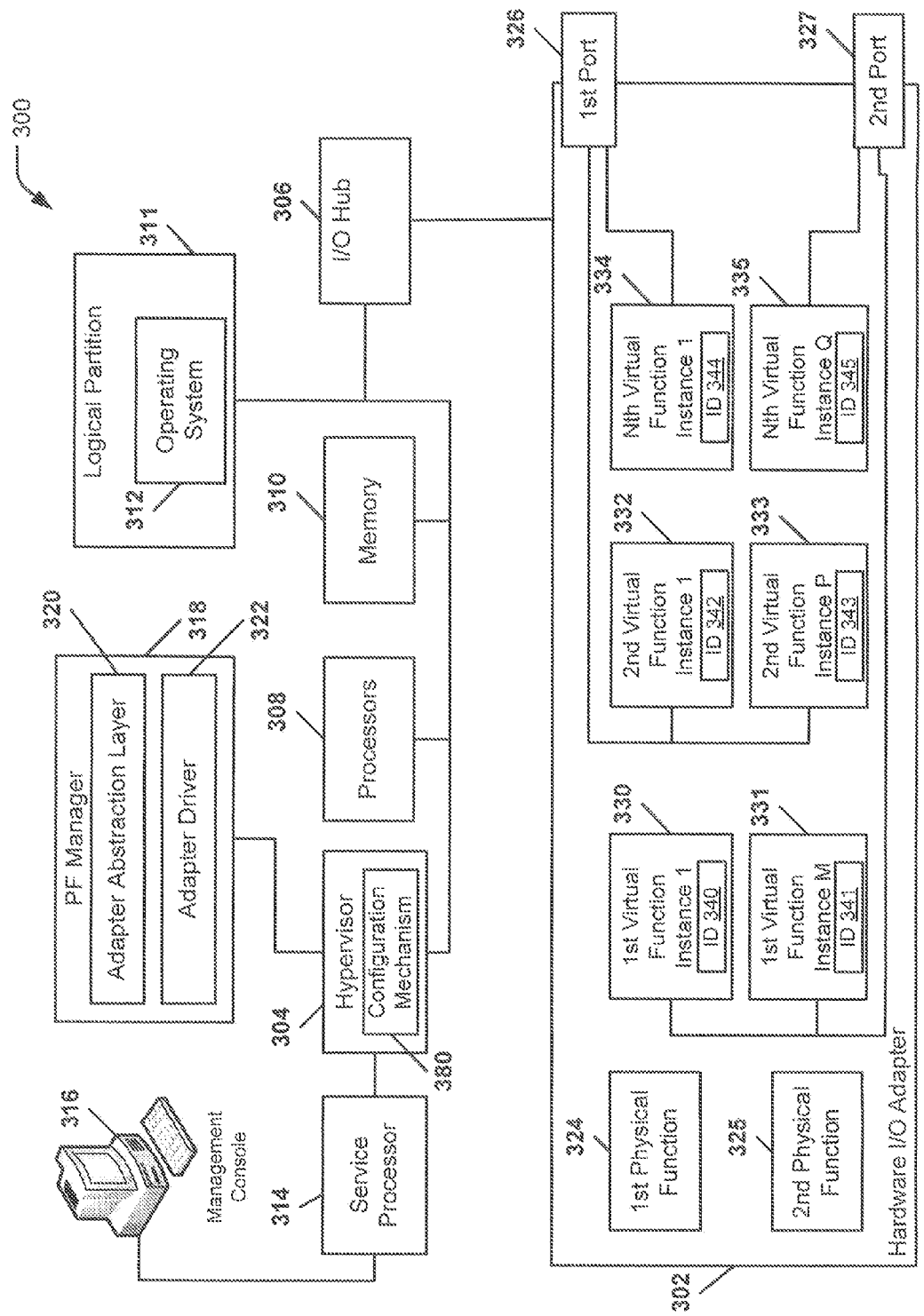
FIG. 3 is a block diagram of a third embodiment of a system to manage a configuration space of an I/O adapter.

Referring to FIG. 3, a block diagram of a third embodiment of a system to emulate SR-IOV functions to an operating system as non-SR-IOV functions is depicted and generally designated 300. In the system 300, a virtualization intermediary (VI) 304 may be coupled to hardware devices, such as a hardware I/O adapter 302, an I/O hub 306, processors 308, and a memory 310. The virtualization intermediary 304 may be coupled to a logical partition 311 that executes an operating system 312. The virtualization intermediary 304 may enable the logical partition 311 to access virtual functions associated with the hardware I/O adapter 302. A physical function (PF) manager 318 may be coupled to the virtualization intermediary 304 to manage the physical functions of the hardware I/O adapter 302. In a particular embodiment, the PF manager 318 may be in a logical partition. A management console 316 may be coupled to the virtualization intermediary 304 via a service processor 314.

The service processor 314 may be a microcontroller that is embedded in a hardware server (e.g., the hardware server 102 of FIG. 1) to enable remote monitoring and management of the hardware server via a management console 316. For example, the management console 316 may be used by a system administrator to specify a configuration of hardware devices, such as specifying virtual functions of the hardware I/O adapter 302. The PF manager 318 may configure virtual functions of the hardware I/O adapter 302 based on configuration information provided by a system administrator via the management console 316.

The virtualization intermediary 304 may enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The virtualization intermediary 304 may associate at least one interrupt source from the pool of interrupt sources 328 with each virtual function of the hardware I/O adapter 302.

The I/O hub 306 may be a hardware device (e.g., a microchip on a computer motherboard) that is under the control of the virtualization intermediary 304. The I/O hub 306 may enable the virtualization intermediary 304 to control I/O devices, such as the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For example, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302. The virtualization intermediary 304 may use the I/O hub 306 to connect to and control I/O devices, such as the hardware I/O adapter 302.

The PF manager 318 may include an adapter abstraction layer 320 and an adapter driver 322. The adapter abstraction layer 320 may include a generic abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports, such as a first physical function 324, a second physical function 325, a first port 326, and a second port 327.

The PF manager 318 may configure virtual functions based on the physical functions 324, 325 and associate the virtual functions with one or more of the ports 326, 327 of the hardware I/O adapter 302. For example, the PF manager 318 may configure the first physical function 324 to host multiple instances of a first virtual function, such as the first instance of the first virtual function 330 and the Mth instance of the first virtual function 331, where M is greater than 1. The instances of the first virtual function 330, 331 may be associated with the second port 327. The PF manager 318 may configure the second physical function 325 to host multiple instances of a second virtual function, such as the first instance of the second virtual function 332 and the $P^{th}$ instance of the second virtual function 333, where P is greater than 1. The instances of the second virtual function 332, 333 may be associated with the first port 326. The PF manager 318 may configure multiple instances of an $N^{th}$ virtual function, such as the first instance of the $N^{th}$ virtual function 334 and the $Q^{th}$ instance of the $N^{th}$ virtual function 335, where N is greater than 2, and Q is greater than 1. The instances of the $N^{th}$ virtual function 334, 335 may be associated with the second port 327. The instances of the $N^{th}$ virtual function 334, 335 may be hosted by a physical function, such as one of the first physical function 324, the second physical function 325, and another physical function (not shown).

Each virtual function (e.g., each of the virtual functions 330-335) may have an associated virtual function identifier (ID). For example, in the system 300, the first instance of the first virtual function 330 may have an associated identifier 340, the Mth instance of the first virtual function 331 may have an associated identifier 341, the first instance of the second virtual function 332 may have an associated identifier 342, the Pth instance of the second virtual function 333 may have an associated identifier 343, the first instance of the $N^{th}$ virtual function 334 may have an associated identifier 344, and the $Q^{th}$ instance of the $N^{th}$ virtual function 335 may have an associated identifier 345.

Each virtual function identifier may uniquely identify a particular virtual function that is hosted by the hardware I/O adapter 302. For example, when a message (not shown) is routed to a particular virtual function, the message may include the identifier associated with the particular virtual function. As another example, a token 313 may be provided to the operating system 312 to enable the operating system 312 to access one of the virtual functions 330-335 at the hardware I/O adapter 302. The token 313 may include a configuration mechanism 380 that is associated with the accessed virtual function. For example, the first instance of the first virtual function 330 may be assigned to the operating system 312. The token 313 may be provided to the operating system 312 to access the first instance of the first virtual function 330. The token 313 may include the virtual function identifier 380. The virtual function identifier 380 may comprise the identifier 340 that is associated with the first instance of the first virtual function 330.

The virtualization intermediary 304 may assign one or more of the virtual functions 330-335 to the logical partition 311. For each virtual function that is assigned to the logical partition 311, the virtualization intermediary 304 may provide the logical partition 206 with a token (not shown) to enable the logical partition 311 to access the virtual function. The token may include a group identifier that identifies a physical slot location of the hardware I/O adapter 302 that hosts the assigned virtual functions.

The virtualization intermediary 304 may provide an access mechanism 380 to enable logical partitions (e.g., the logical partition 311) to access configuration space associated with one or more of the virtual functions 330-335. The virtualization intermediary 304 may include an access mechanism 279 to enable logical partitions to access the PCI memory space, PCI DMA space, and interrupt ranges associate with virtual functions. In a legacy or SR-IOV model, the operating system device driver may access to the PCI memory that maps BARs, as well as access to a DMA window that the virtual function can use to DMA to memory, and a range of PCI interrupts the device driver can use to enable the virtual function to signal interrupts. This feature may provide for virtual functions in the same or a similar manner to that of legacy mode adapter function.

Figure 4:
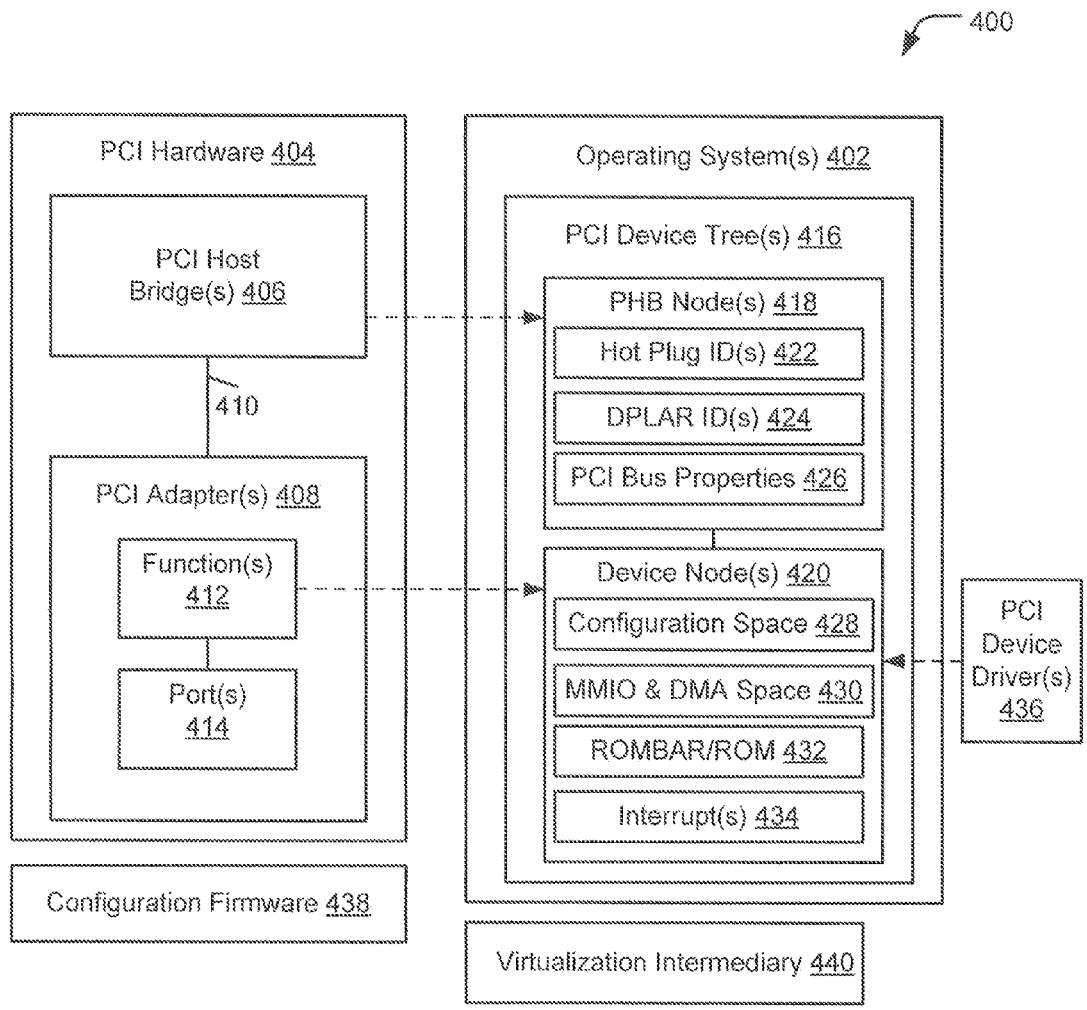
FIG. 4 is a block diagram of an embodiment of a system having an operating system that manages elements of a non-shared, legacy PCI adapter.

FIG. 4 shows a block diagram of an embodiment of a logically partitioned computing system 400 having an operating system 402 configured to manage elements of PCI hardware 404, including a PCI adapter 408. The PCI adapter 408 may be non-shared, e.g., owned by a single operating system 402. The PCI Adapter 408 may be a legacy adapter. The computing system 400 may further include PCI configuration firmware 438 and a virtualization intermediary (VI) 440, such as a hypervisor.

The PCI hardware 404 may include a PCI host bridge (PHB) 406, associated with a PCI-express root port (not shown). The PCI host bridge 406 may be coupled to a PCI adapter 408 via a PCI bus 410 representing a PCIe physical link connection (not shown) between the PCIe root port and a PCI adapter 408. The PCI adapter 408 may include a function 412 and a port 414.

The operating system 402 may include a PCI device tree 416 and a PCI device driver 436. The PCI device tree 416 may include a PCI host bridge node 418 and a device node 420. The PCI host bridge node 418 may include a hot plug identifier (ID) 422, a dynamic logical partitioning (DLPAR) ID 424, and PCI bus properties 426. The device node 420 may include a configuration space 428, memory-mapped I/O (MIMIO) and direct memory access (DMA) space 430, a PCI read only memory base address register/read-only memory (ROMBAR/ROM) space 432, and an interrupt 434.

The PCI host bridge 406 may create an instance of the PCIe bus 410 connected to the PCI adapter 408. The function(s) 412 may be individually addressable in PCI configuration address space. For example, the function(s) 412 may have the same PCI device number and differing PCI function numbers (e.g., ranging from 0 to 7). Alternatively, the PCI adapter 408 may use PCI alternate routing ID (ARI) configuration addressing. Each function 412 may have a unique configuration function number ranging from 0 to 255 at an implied device number of 0. Each function 412 may be associated with a unique physical port 414 within the PCI adapter 408. The physical port 414 may create a connection to an external peripheral I/O interconnect, such as Ethernet, Fiber Channel, or another peripheral device interconnect.

The function(s) 412 may form a device driver programming interface by which the operating system 402 may utilize the PCI device driver 436. The PCI host bridge node(s) 418 may represent the PCI host bridge(s) 406, and the PCI device node(s) 420 may represent each instance of the function(s) within the PCI adapter 408.

The PCI host bridge node 418 may include properties, or functions, descriptive of the PCI host bridge 406. Such properties may include characteristics of the PCIe bus 410 created by that PCI host bridge 406. The characteristics may be used by the operating system 402 to manage the PCI host bridge 406 and by the PCI device driver 436 to perform PCI bus transactions. For example, the PCI host bridge node properties may include an identifier used for a hot plug domain 422 and an identifier for a DLPAR domain 424.

The operating system 402 may utilize the configuration firmware 438 to detect the presence of PCI devices, such as the function(s) 412. For each detected function 412, the configuration firmware 438 may generate a device node 420 associated with the PCI host bridge node 418 of the PCI device tree 416. The device node 420 may include functions, or properties, associated uniquely with the function 412 and used by the operating system 402 to identify the type and programming interface of the function 412. Illustrative such functions may relate to the configuration space 428 and the ROMBAR/ROM space 432. The properties may further be used by the device driver 436 to perform PCI bus transactions specific to that function 412, as well as to properties relating to the MIMIO and DMA space 430, the ROMBAR/ROM space 432, and the interrupts 434.

For each device node 420 within the PCI device tree 416, the operating system 402 may activate an instance of the device driver 436 to control the characteristics of the associated function 412. Data transfer operations may be performed between the operating system 402, the external interconnect, and devices accessed through the corresponding physical port 414.

The hot plug ID 422 of the PCI host bridge node 418 may be used to identify the PCI bus 410 physical connection point, or slot. The slot may be located between the PCI host bridge 406 and the PCI adapter 408. The operating system 402 may use the hot plug ID 422 when adapter a power-off or power-on operation is performed. The operating system 402 may be running and may be in control of the PCI host bridge 406 and the PCI bus 410.

To power-off the adapter 105, the operating system 402 may correlate a hot plug ID of a hot plug power-off/on operation with the hot plug ID 422 of the PCI host bridge node 418. As part of performing the power-off operation, the operating system 402 may first deactivate the device driver(s) 436. As discussed herein, the device driver(s) 436 may be associated with each device node 420, and each device node 420 may be associated with the PCI host bridge node 418.

When powering-on the PCI adapter 105, the configuration firmware 438 associated with the operating system 402 may interrogate each possible PCI configuration address of the PCI bus 410 to detect each function 412. The configuration firmware 438 may construct a device node 420 that is associated with the PCI host bridge node 418. The operating system 402 may create instances of the device driver(s) 436 that are associated with each device node 420. The device driver(s) 436 may control each of the associated functions 412.

The PCI host bridge(s) 406 may be connected individually to PCI slots. Slots may be a connection point at which the PCI adapters 408 may be added at a future time. The configuration firmware 438 may generate the PCI host bridge node(s) 418 of the PCI device tree 416 for each PCI host bridge 406. This generation may occur at an instance where the PCI host bridge 406 is connected to a PCI slot that is empty (e.g., does not have a PCI adapter 408 present).

The PCI adapter 408 may be transferable to different logical partitions using DLPAR. The PCI host bridge node 418 of the PCI device tree 416 may represent the domain of the functions 412 that are transferred, collectively, between logical partitions of the operating system 402. The virtualization intermediary 440 may act as a management agent of a system administrator to automatically associate elements of the PCI hardware 404 with an operating system(s) 402 comprising logical partitions.

The virtualization intermediary 440 may function as a system administrator for DLPAR by removing the PCI adapter 408 from the operating system 402. More specifically, the virtualization intermediary 440 may signal to the operating system 402 to initiate removal of a particular PCI adapter 408 having a DLPAR ID that references a matching DLPAR ID 424 of the operating system 402. As part of removing the PCI adapter 408 from the operating system PCI configuration, the operating system 402 may deactivate the PCI device driver(s) 436 associated with each device node 420 that is associated with that PCI host bridge node 418. The operating system 402 may release control of the PCI host bridge 406 and the PCI adapter 408 to the virtualization intermediary 440.

When adding a PCI adapter 408 to the PCI configuration of an executing operating system 402, the virtualization intermediary 440 may signal the operating system 402 to add the PCI host bridge node 418 to the PCI device tree 416. The virtual PCI host bridge node 418 may correspond to the physical PCI host bridge 406 and to the associated PCIe bus 410. The operating system 402 may invoke the configuration firmware 438 to detect the functions 412 of the PCI adapter 408. The configuration firmware 438 may update the PCI device tree 416 with a device node 420 corresponding to each detected function 412 that is associated with the PCI host bridge node 418 and/or PCIe bus 410. The operating system 402 may create an instance of the PCI device driver 436. The PCI device driver 436 may be associated with each device node 420 in order to control each of the associated functions 412.

Figure 5:
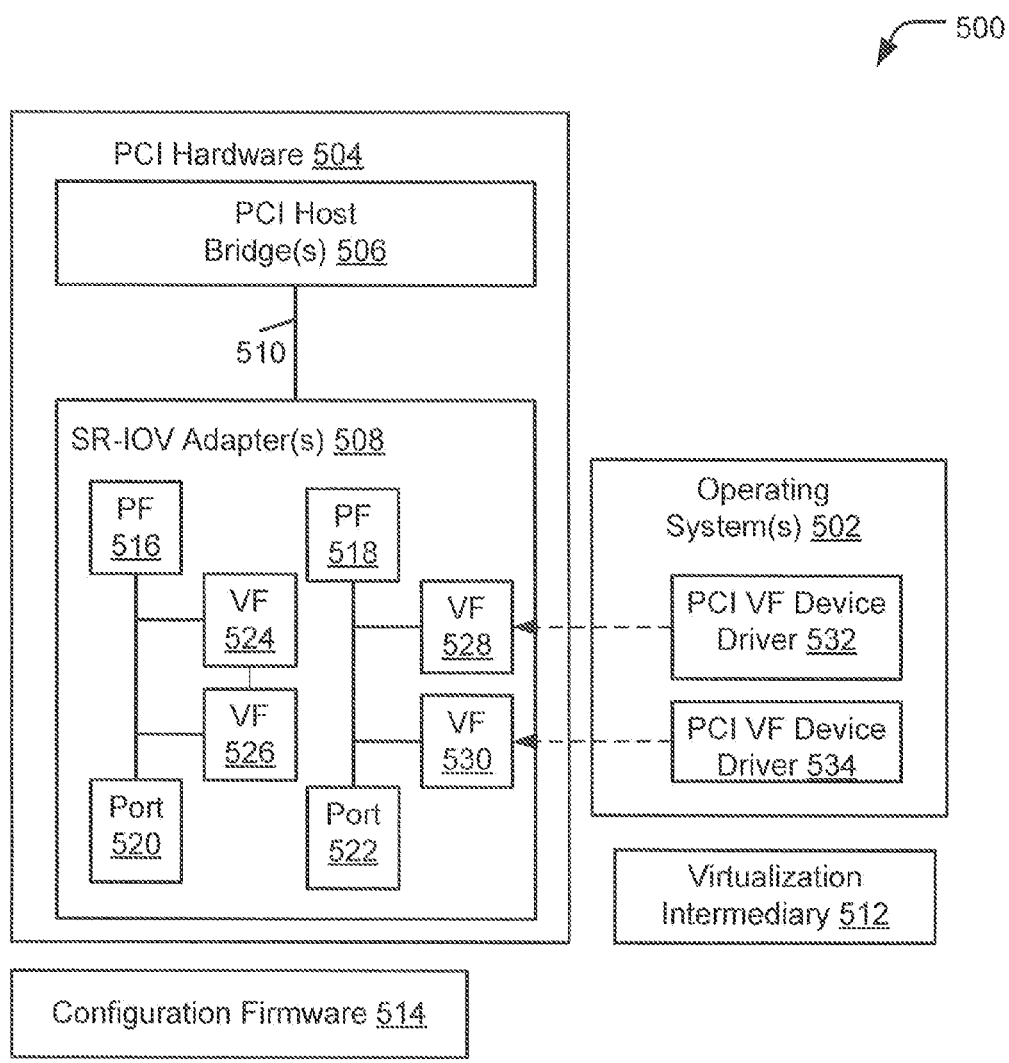
FIG. 5 is a block diagram of an embodiment of a system having an operating system that manages elements of a non-shared, SR-IOV adapter.

FIG. 5 shows a block diagram of an embodiment of a logically partitioned computing system 500 having an operating system 502 configured to manage elements of PCI hardware 504, including an SR-IOV adapter 508. The computing system 500 may further include a virtualization intermediary 512 and configuration firmware 514. In one sense, FIG. 5 illustrates the PCI hierarchy for the SR-IOV adapter 508. According to an embodiment, the virtualization intermediary 512 automatically and selectively maps an SR-IOV function to an emulated PCI-standard function to enable control by the operating system 502.

The PCI hardware 504 may include a PCI host bridge (PHB) 506, associated with a PCIe root port (not shown). The PCI host bridge 506 may be coupled to the SR-IOV adapter 508 via a PCI bus 510, representing a PCIe physical link connection (not shown) between the PCI-express root port and the SR-IOV adapter 508. The SR-IOV adapter 508 may include physical functions (PFs) 516, 518 respectively coupled to ports 520 and 522. The SR-IOV adapter 508 may further include virtual functions (VFs) 524, 526 associated with the physical function 516, and virtual functions 528, 530 associated with the physical function 518. The operating system 502 may include multiple PCI virtual function device drivers 532, 534.

The SR-IOV adapter 508 may present one or more of the physical functions 516, 518 at the PCI bus device 510 across a PCI link. The physical functions 516, 518 may respond to configuration read and write cycles (e.g., at physical functions 516, 518 numbering 0 through 7). Alternatively, the SR-IOV adapter 508 may be designed according to PCI alternate routing ID (ARI) configuration addressing. Each physical function 516, 518 may have a unique configuration function number (e.g., ranging from 0 to 255 at an implied device number of 0). The ports 520, 522 may create a connection to an external peripheral I/O interconnect, such as Ethernet, Fiber Channel, or other peripheral device interconnects.

Each physical function 516, 518 may be further configured by the virtualization intermediary 512 into one or more of the virtual functions 524, 526, 528, 530. An embodiment of the virtualization intermediary 512 may include program code residing within firmware of the computer system 500. An embodiment of the virtualization intermediary 512 may include a hypervisor. The hypervisor may be a component of the computer system firmware or a type of operating system, or program within an operating system, that is a host to the operating systems 502. Another embodiment of the hypervisor may be a PCI manager program within the computer system having access to the SR-IOV adapter 508 by some physical interconnect that may be a PCI link or other physical connection. The PCI manager of an embodiment may be located locally or remotely, e.g., in a separate processor or memory.

Each virtual function 524, 526, 528, 530 may provide a PCI device programming interface that may be controlled by a PCI virtual function device driver 532, 534. The PCI virtual function device drivers 532, 534 may control the virtual functions 524, 526, 528, 530 to perform I/O transactions through the ports 520, 522 on behalf of the operating system 502.

As discussed herein, the virtual functions 524, 526, 528, 530 may be created under physical functions 516, 518, which may be associated with the ports 520, 522. The virtual functions 524, 526, 528, 530 may thus share the physical facilities of the ports 520, 522. The virtual functions 524, 526, 528, 530 may have a limited ability to perform I/O transactions through the ports 520, 522 and may affect the physical states of the ports 520, 522. The virtual functions 524, 526, 528, 530 may reconfigure the number and capabilities of the individual physical function 516, 518 within the SR-IOV adapter 508.

Figure 6:
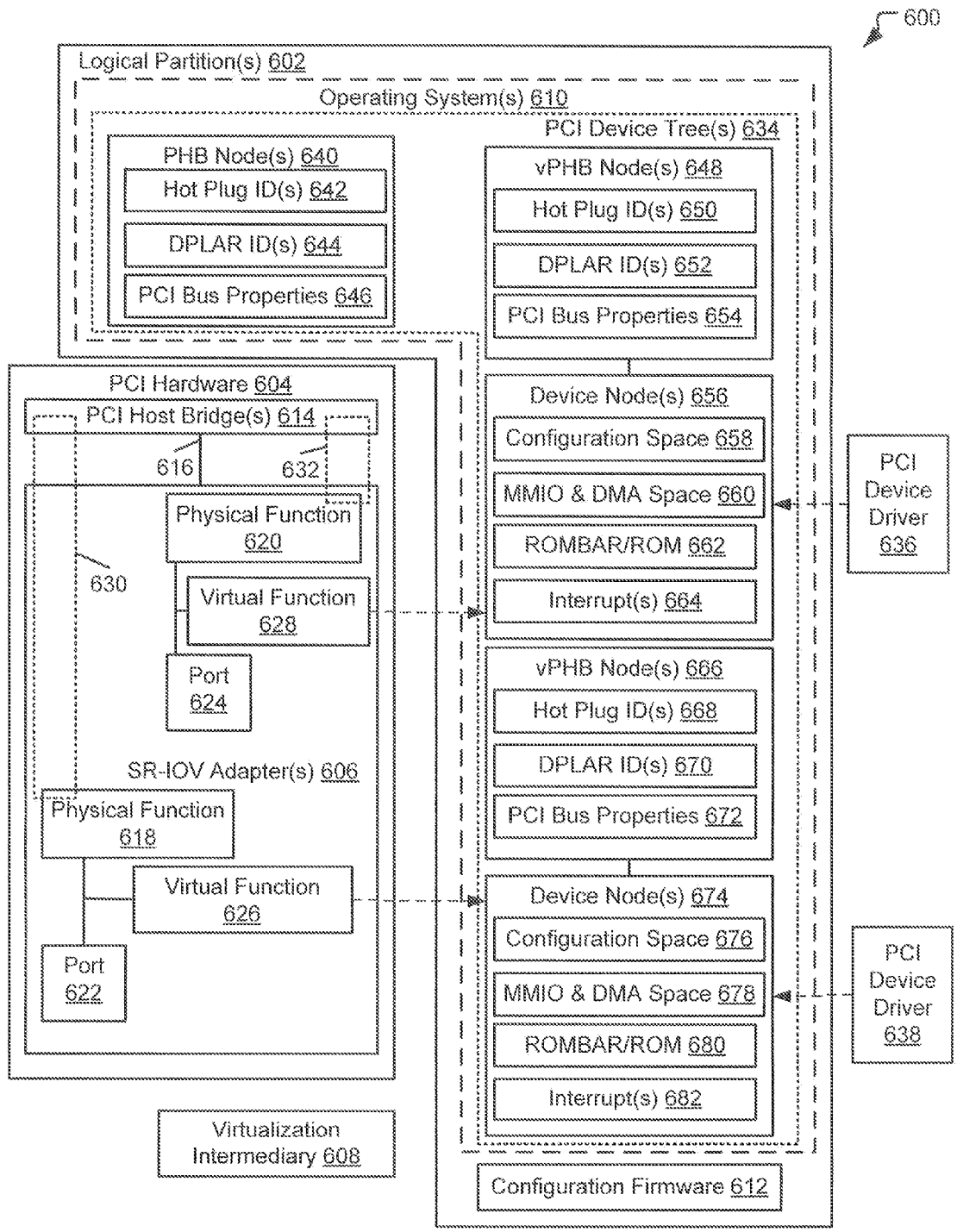
FIG. 6 is a block diagram of an embodiment of a system having an operating system that manages elements of an adapter.

FIG. 6 shows a block diagram of an embodiment of a logically partitioned computing system 600 having an logical partition 602 configured to manage elements of computer system hardware 604, including an SR-IOV adapter 606. The SR-IOV adapter 606 may be non-shared, in that it is assigned to single logical partition 602. The logical partition 602 may include an operating system 610 and configuration firmware 612. The computing system 600 may include a virtualization intermediary 608 configured to automatically map an SR-IOV function to an emulated PCI-standard function to enable control by the logical partition 602 and/or the operating system 610.

The computer system hardware 604 may include a PCI host bridge (PHB) 614 coupled to the SR-IOV adapter 606 via a PCIe link 616. A PCIe bus (not shown) may be logically superimposed on the PCIe link 616 to facilitate PCI bus transactions between the PCI host bridge 614 and the SR-IOV adapter 606.

The SR-IOV adapter 606 may include physical functions (PFs) 618, 620 that are respectively coupled to ports 622 and 624. The SR-IOV adapter 606 may further include a virtual function (VF) 626 associated with the physical function 618, and a virtual function 628 associated with the physical function 620. As shown in FIG. 6 in broken lines, blocks 630 and 632 represent virtual PCI host bridge domains.

The operating system 610 may include a PCI device tree 634 and multiple PCI virtual function device drivers 636, 638. The PCI device tree 634 may include a PCI host bridge node 640. The PCI host bridge node 640 may be associated with the PCI host bridge 614. The PCI host bridge node 640 may include a hot plug ID 642, a DLPAR ID 644, and PCI bus properties 646.

A virtual PCI host bridge node 648 of the PCI device tree 634 may be associated with the virtual PCI host bridge domain 632. The virtual PCI host bridge node 648 may include a hot plug ID 650, a DLPAR ID 652, and PCI bus properties 654. The virtual PCI host bridge node 648 may be associated with a device node 656. The device node 656 may also be associated with the virtual function 628 and the PCI virtual function device driver 636. The device node 656 may include a configuration space 658, MIMIO and DMA space 660, PCI ROMBAR/ROM space 662, and interrupts 664.

A virtual PCI host bridge node 666 of the PCI device tree 634 may be associated with the virtual PCI host bridge domain 630. The virtual PCI host bridge node 666 may include a hot plug ID 668, a DLPAR ID 670, and PCI bus properties 672, derived from the properties of the physical PCI Host Bridge 614 and PCI bus link 616 and its associated PCI bus (not shown). The virtual PCI host bridge node 666 may be associated with a device node 674. The device node 674 may also be associated with the virtual function 626 and the PCI virtual function device driver 638. The device node 674 may include a configuration space 676, MIMIO and DMA space 678, PCI ROMBAR/ROM space 680, and interrupts 682 that are an exclusive subset of the MMIO, DMA, and ROMBAR spaces and interrupts provided by the physical PCI host bridge 614.

The SR-IOV adapter 606 may present one or a plurality of the physical functions 618, 620 at the PCIe link 616 across a PCIe bus. The physical functions 618, 620 may respond to configuration read and write cycles. Alternatively, the SR-IOV adapter 606 may be designed according to PCI ARI configuration addressing. Each physical function 618, 620 may have a unique configuration function number. The ports 622, 624 may create a connection to an external peripheral I/O interconnect, such as Ethernet, Fiber Channel, or other peripheral device interconnects.

Each physical function 618, 620 may be further configured by the virtualization intermediary 608 into one or more of the virtual functions 626, 628. An embodiment of the virtualization intermediary 608 may include a program code within firmware of the computer system 600. Another embodiment of the virtualization intermediary 608 may be a hypervisor. The virtualization intermediary 608 may be a component of the computer system firmware or a type of operating system that is a host to the operating systems 610. Another embodiment of the virtualization intermediary 608 may be a PCI manager.

Each virtual function 626, 628 may provide a PCI device programming interface that may be controlled by PCI virtual function device drivers 636, 638. The PCI virtual function device drivers 636, 638 may control the virtual functions 626, 628 to perform I/O transactions through the ports 622, 624 on behalf of the operating system 610.

As discussed herein, the virtual functions 626, 628 may be created under the physical functions 618, 620, which may be associated with the ports 622, 624. The virtual functions 626, 628 may thus share the physical facilities of the ports 622, 624. The virtual functions 626, 628 may have a limited ability to perform I/O transactions through the ports 622, 624 and may affect the physical state of the port 622, 624. The virtual functions 626, 628 may reconfigure the number and capabilities of individual physical function 618, 620 within the SR-IOV adapter 606.

Each of the virtual functions 626, 628 may be assigned to a different logical partition to enable the logical partitions 602 to access and I/O transaction resources of the SR-IOV adapter 606 and the ports 622, 624. In another embodiment, the SR-IOV adapter 606 may be assigned to a single logical partition (e.g., and may not be shared by other logical partitions).

The computer system 600 may be configured with the single logical partition 602 and the associated operating system 610 so as to appear as a non-partitioned computer system. The PCI virtual function device driver 636 may be configured for a particular type of virtual function, regardless of whether the SR-IOV adapter 606 is shared, non-shared, owned by a single operating system 610, or is located in a logically partitioned computing system.

The configuration firmware 612 may determine the PCI hierarchy containing the SR-IOV adapter 606. Prior to that determination, the virtualization intermediary 608 may detect and configure the SR-IOV adapter to establish a virtual function 626, 628 for each of the physical ports 622, 624. For an illustrative SR-IOV adapter 606, the virtualization intermediary 608 may configure virtual functions 626, 628 to be in a one-to-one correspondence with each physical port 618, 620.

The SR-IOV adapter 606 may support different peripheral device protocols to concurrently access a physical port 618, 620. For example, the SR-IOV adapter 606 may be a converged network adapters configured to enable Ethernet and Fiber-Channel-Over-Ethernet (FCoE) protocols to simultaneously operate over a single physical port 618, 620.

The virtualization intermediary 608 may create a unique instance of a virtual function 626, 628 for each protocol and on each physical port 618, 620 configured to operate multiple protocols. For example, for an illustrative SR-IOV adapter having four physical ports and enabling two protocols (e.g., Ethernet and FCoE), the virtualization intermediary 608 may configure two virtual functions on each physical port, for a total of eight virtual functions.

The virtualization intermediary 608 may provide the configuration firmware 612 with information to construct the PCI device tree 634 having the virtual PCI host bridge nodes 648, 666. The virtual PCI host bridge node 648 may correspond to the virtual function 628 of the SR-IOV adapter 606 assigned to the logical partition 602. Each virtual PCI host bridge node 648, 666 may be similar to the PCI host bridge node 418 of the device tree 416 in FIG. 3. Each virtual PCI host bridge node 648, 666 may be representative of the combined PCI bus and DLPAR domain properties of the PCI host bridge 614, the SR-IOV adapter 606, and the physical function 618, indicated as the virtual PCI host bridge domain 630.

The PCI bus properties 654 may be used by the virtualization intermediary 608 to address the virtual PCI host bridge domain 632. For instance, the virtualization intermediary 608 may translate PCI bus operations targeting the virtual PCI host bridge node 648. As such, the presence of the physical function 620 may be transparent to the operating system 610, as well as to the configuration firmware 612 of the logical partition 602.

The configuration firmware 612 may perform PCI hierarchy detection using PCI configuration read operations across the PCIe link 616. The configuration firmware 612 may thus detect the presence of a PCI function at various possible device addresses. For example, a function may be detected at function numbers 0 through 7, or alternatively at ARI function numbers 0 through 255 of an implied ARI device number.

The virtualization intermediary 608 may intercept PCI configuration read or write transactions to the PCIe link 616. The virtualization intermediary 608 may respond to a PCI bus configuration read operation such that the configuration firmware 612 first detects the virtual function 626 at an emulated function number 0 of the virtual PCI host bridge bus and device 0. The virtualization intermediary 608 may respond to the configuration firmware reads that are directed to only PCI device 0 and function 0 below the virtual PCI host bridge. The configuration firmware 612 may detect only a single PCI function, at function 0, in the PCI hierarchy below the virtual PCI host bridge. The virtual function 626 may thus be represented to the operating system 610 in a manner analogous to that of a PCI single function legacy adapter, such as the PCI adapter 408 of FIG. 4.

The virtualization intermediary 608 may pass configuration read operations directly to an actual virtual function configuration register within the SR-IOV adapter 606. The logical virtual PCI host bridge bus number and device function number may be translated to the actual PCI configuration bus/device/function number utilized on the physical PCI bus, or PCIe link 616.

In another embodiment, the virtualization intermediary 608 may respond directly to the configuration firmware read operations with an emulated register value. The virtualization intermediary 608 may have derived the emulated register value as part of configuring the SR-IOV adapter 606 in SR-IOV mode. This action may maintain the appearance of the virtual functions 626, 628 as single PCI function. The transparency of the physical functions 618, 620 on the virtual PCI host bridge bus may further be maintained with respect to the configuration firmware 612.

The configuration firmware 612 may also be modified from a legacy PCI function configuration to account for limitations of the PCI SR-IOV Architecture. The limitations may relate to the assignment of memory mapped address spaces associated with the virtual functions 626, 628. The configuration firmware 612 may write to the PCI base address registers of a PCI function to determine the size of the PCI memory space used by that base address register of that function. The configuration firmware 612 may select a location within PCI memory at which to bind the base address register and associated PCI memory space. However, the virtualization intermediary 608 may establish a location of the PCI memory regions to map virtual function PCI memory spaces using base address registers in the physical functions 618, 620.

According to the SR-IOV architecture, the virtual functions 626, 628 may not actually implement the PCI base address registers of a PCI function. As such, the PCI bus properties 654 of the virtual PCI host bridge node 648 may specify that the PCI base address registers are read only and cannot be changed in relation to their PCI memory location. As discussed herein, the PCI base address registers may belong to the device(s) on the PCI bus associated with the virtual PCI host bridge node 648.

In order for the configuration firmware 612 to determine the size of each PCI base address space within the virtual functions 626, 628, the configuration firmware 612 may perform the configuration write of all-ones data to each base address register. The virtualization intermediary 608 may emulate the action by storing temporary all-ones values. Where the configuration firmware 612 reads from the base address register, the virtualization intermediary 608 may return an emulated value of all-one bits. The emulated value may indicate the power of two size of the PCI memory space associated with the virtual function base address register. The virtual functions 626, 628 may then return the actual PCI address associated with that virtual function base address register for subsequent configuration reads from that virtual function base address register.

A legacy PCI function may be connected to a ROM device containing adapter vital product data or boot drivers used with that PCI function or adapter. The PCI function may include a ROMBAR that is subject to location within PCI memory by the configuration firmware 612. The virtualization intermediary 608 and configuration firmware 612 may perform the same sequence regarding the ROM base address register within the virtual function configuration space.

The operating system 610 may provide hot plug support. A hot plug module may enable a user to use an application interface within the operating system 610 to select a particular physical slot. The physical slot may include a PCI adapter for powering off or on. The hot plug module may enable the user to remove or add a PCI adapter without disrupting other functions of the computer system 600.

The PCI device tree 634 may be generated by the virtualization intermediary 608. The PCI host bridge node 640 of the PCI device tree 634 may represent the physical PCI host bridge 614 of the computer system hardware 604. The PCI host bridge node 640 may not include a PCI device within its hierarchy, but may include a hot plug ID 642. The operating system 610 may associate the hot plug ID 642 with a physical location of a PCIe slot. The PCIe slot may accommodate an adapter, such as the SR-IOV adapter 606, or a legacy, non-SRIVO PCIE adapter, in the same location connected to the PCIe link 616.

The hot plug ID 642 may be a logical ID that corresponds to a physical slot location or a power domain associated with the physical slot. The hot plug ID 642 may, itself, be the physical location ID, such as a system physical location code. Hot plug power operations may utilize the hot plug ID 642 to instruct the operating system 610 with the physical location of a power domain within the computer system hardware 604. The power domain may be the object of a power off or power on operation. The operating system 610 may use the hot plug ID 642 to determine PCI host bridges and PCI devices within the PCI device tree 634 that are affected by a power off or power on to the hot plug location.

An empty PCI slot may be assigned to a logical partition 602, and a PCI adapter may later be added to the PCI slot. The virtualization intermediary 608 may present the operating system 610 with the PCI host bridge node 640. The operating system 610 may use the PCI host bridge node 640 to identify the location of a hot plug power on operation. Such a hot plug power operation may add a PCIe adapter to a physical PCI host bridge 614.

While the adapter shown in FIG. 6 is an SR-IOV adapter, a hot plug operation of another embodiment may include a non-SR-IOV adapter having similar or the same connectivity and location possible. In a particular embodiment, a PCIe adapter may be connected to a PCI host bridge that is associated with a previously empty or powered-off slot. When the computing system hot plug module performs a power-on of the PCIe adapter, the virtualization intermediary may determine whether the adapter is SR-IOV-capable. Where the adapter is a non-SR-IOV type of adapter, the virtualization intermediary may take no further action. The configuration firmware may detect a PCI device tree for the non-SR-IOV adapter with a device driver, as shown in FIG. 4. Where the adapter 606 is SR-IOV capable, the virtualization intermediary 608 may further determine whether the operating system 610 uses SR-IOV virtual function device drivers 636, 638 or a non-SR-IOV mode device driver.

According to a particular embodiment, the virtualization intermediary 608 determines that the operating system 610 does not use virtual function device drivers for the adapter 606. In such a scenario, the virtualization intermediary 608 may take no further action. As shown in FIG. 4, the configuration firmware 438 may detect a PCI device tree 416 for the adapter 406. Alternatively, the virtualization intermediary 608 may determine that the operating system 610 does use virtual function device drivers 636, 638 for the adapter 606. In response, the virtualization intermediary 608 may configure the adapter 606 as SR-IOV enabled with a single virtual function 626, 628 for each device protocol utilized on each port 622, 624.

The virtualization intermediary 608 may generate the PCI device tree 634 for the operating system 610. The operating system 610 may include the PCI host bridge node 640 and the virtual PCI host bridge node 648 for each virtual function 626, 628. The virtualization intermediary 608 may intercept PCI configuration cycles of the configuration firmware 612 to the PCI bus. The PCI bus may be associated with the PCI host bridge 614. The virtualization intermediary 608 may return that there are no devices present. For example, the PCI host bridge node 640 may have no associated device nodes 656. The configuration firmware 612 may detect a single PCI function at each PCI host bridge node 614 to generate a device node 656 for that associated virtual function. The configuration firmware 612 may further create an instance of a virtual function device driver 636, 638 in association with the device node 656.

An embodiment may enable the powering-off an adapter that is configured within a running logical partition 602. The power-off operation may allow repair or replacement of an adapter with an alternative adapter. The new adapter may be a different type than the original adapter.

The hot plug power off operation may use the hot plug ID 650 to identify a power domain containing a PCIE adapter. Accordingly, the hot plug ID 650 may enable the virtualization intermediary 608 to identify all PCI hierarchies and devices within the shared hot plug domain represented by the physical slot location of the adapter 606.

Prior to performing the physical power off operation, the operating system 610 may determine all affected PCI devices by correlating the hot plug ID specified in the operation with the hot plug IDs 650, 668 in all virtual PCI host bridge nodes 648, 666. The operating system(s) 610 may then terminate the operations of the device drivers 636, 638 associated with the device nodes 656, 674 under each virtual PCI host bridge node 648, 666 having that same hot plug ID 650, 668. Once the device drivers 636, 638 have terminated operations, the virtualization intermediary 608 and hot plug module may continue with the physical power off operation of the hot plug domain associated with that hot plug ID 650, 668.

Where a PCIe slot containing an adapter has been powered off, it may be possible for the system user or a service representative to repair or replace the adapter. The replacement adapter may be a different type of adapter (e.g., replacing a PCIe adapter with an SR-IOV capable adapter or vice versa). In either case, a subsequent power-on of the PCIe slot may result in the virtualization intermediary 608 presenting the operating system 610 with an updated PCI device tree 634. The operating system 610 may use the SR-IOV virtual function device drivers 636, 638, along with virtual PCI host bridge nodes 648, 666 for each of the SR-IOV virtual functions 626, 628 that has been configured by the virtualization intermediary 608.

A PCI slot may be removed from or added to the control of a particular running logical partition 602. A PCI adapter may be removed from a logical partition to transfer that adapter to another logical partition during a dynamic logical partitioning (DLPAR) operation. DLPAR operations may reference a PCIE adapter. For example, the PCIE slot location within the computer system 600 may be referenced using a DLPAR ID 652, 670.

According to an embodiment, a PCIe slot associated with the PCI host bridge 614 may not be assigned initially to the logical partition 602 at the time that the logical partition 602 is booted. Adding the PCIe slot to the logical partition 602 may result in the virtualization intermediary 608 adding a PCI host bridge node 640, 674 to the PCIE device tree 634. Where the adapter is a non-SR-IOV type, the virtualization intermediary 608 may take no further action. The configuration firmware 612 may detect the PCI device tree 634 for the adapter 606, as shown in FIG. 4.

Where the adapter 606 is SR-IOV capable, the virtualization intermediary 608 may determine whether the operating system 610 uses the SR-IOV virtual function device drivers 636, 638 as non-SR-IOV mode device drivers. Where the SR-IOV virtual function device drivers 636, 638 are not used, the virtualization intermediary 608 may take no further action, and the configuration firmware 612 may detect a PCI device tree for that adapter 606. Where the SR-IOV virtual function device drivers 636, 638 are alternatively used, the virtualization intermediary 608 may configure the adapter as SR-IOV enabled with a single virtual function 626, 628 for each device protocol utilized on each port 622, 624. The virtualization intermediary 608 may further generate the PCI device tree 634 for the operating system 610, as shown in FIG. 6. As discussed herein, the PCI device tree 634 may include the PCI host bridge node 640 and the virtual PCI host bridge nodes 648, 666 for each virtual function 626, 628.

The virtualization intermediary 608 may intercept the PCI configuration cycles of the configuration firmware 612 to the PCI bus associated with the vPHBs 648, 666. The configuration firmware 612 may then detect a single PCI function at each PCI host bridge node 648, 666 to generate a device node 656, 674 for the associated virtual function. The configuration firmware 612 may further create an instance of a virtual function device driver 636, 638 associated with the device node 656, 674.

According to an embodiment, no adapter may be physically plugged into a PCI slot that has been transferred to the running logical partition 602. A later hot plug power-on operation may add an adapter to the running logical partition 602. For example, the virtualization intermediary 608 may enable the operating system 610 to selectively use the adapter 606 according to a legacy or an SR-IOV configuration. Conversely, a user may initiate the automatic removal of the SR-IOV adapter 606 from the running logical partition 608. The DLPAR ID 652, 670 may be used by the operating system 610 of that logical partition 608 to identify all PCI hierarchies and devices that will be removed during the DLPAR operation.

As represented by the PCI device tree 634, the operating system 610, may determine the affected PCI devices prior to relinquishing control of the affected PCI devices. The operating system 610 may correlate the DLPR ID specified in the operation with the DLPAR IDs 652, 670 in all virtual PCI host bridge nodes 648, 666. The operating system(s) 610 may then terminate the operations of the virtual PCI host bridges (vPHBs) 648, 666 having DLPAR IDs 652, 670 and the device nodes 656, 674 under each virtual PCI host bridge 648, 666 (e.g., having that same DLPAR ID 652, 670). Once all the device drivers 636, 638 have terminated operations, the slot may be assigned to another, different logical partition 602. The slot may alternatively be added back to the original logical partition 602.

According to a particular embodiment, an SR-IOV adapter may be plugged below a PCI bridge, such as a PCI bridge of a PCIe switch. The PCIe switch may form a PCIe link below a bridge that is analogous to the PCIe link 616. The virtual PCI host bridge 648, 666 may be presented to the logical partition configuration firmware 612. The PCI bus properties 646, 672 of the virtual PCI host bridge 648, 666 may account for combined properties of the physical PCI host bridge 614 and the PCIe switch. Illustrative such properties may include PCI bus memory and DMA address ranges, as well as interrupt assignments.

According to a particular embodiment, the virtualization intermediary 608 may not configure the SR-IOV adapter 606 for SR-IOV mode. Alternatively, the virtualization intermediary 608 may enable the configuration firmware 612 to fully detect and control configuration functions of the SR-IOV adapter 606. As such, the configuration firmware 612 may, itself, configure the SR-IOV adapter 606 for SR-IOV mode. The configuration firmware 612 may function as a virtualization intermediary local to the logical partition 602. The local virtualization intermediary may make the SR-IOV aspects of the SR-IOV adapter 606 visible to elements of the logical partition 602, the operating system 610, the device tree 634, or the device drivers 636, 638.

Operations of an embodiment are not limited by whether or not the configuration firmware 612 enables SR-IOV mode within an SR-IOV adapter that has not been virtualized by a virtualization intermediary 608 external to the logical partition 602. Operability may further be independent of what by method the logical partition 602 represents the SR-IOV adapter 606 within its device tree 634 or enables device driver translations to the functions of the SR-IOV adapter 606.

The SR-IOV adapter 606 may be assigned to a single operating system within a logical partition that is non-shared. The system 600 of a particular embodiment may determine whether to configure the SR-IOV adapter 606 for SR-IOV mode based on a configuration file accessible to the virtualization intermediary 608 upon detecting that the adapter is SR-IOV-capable.

Figure 7:
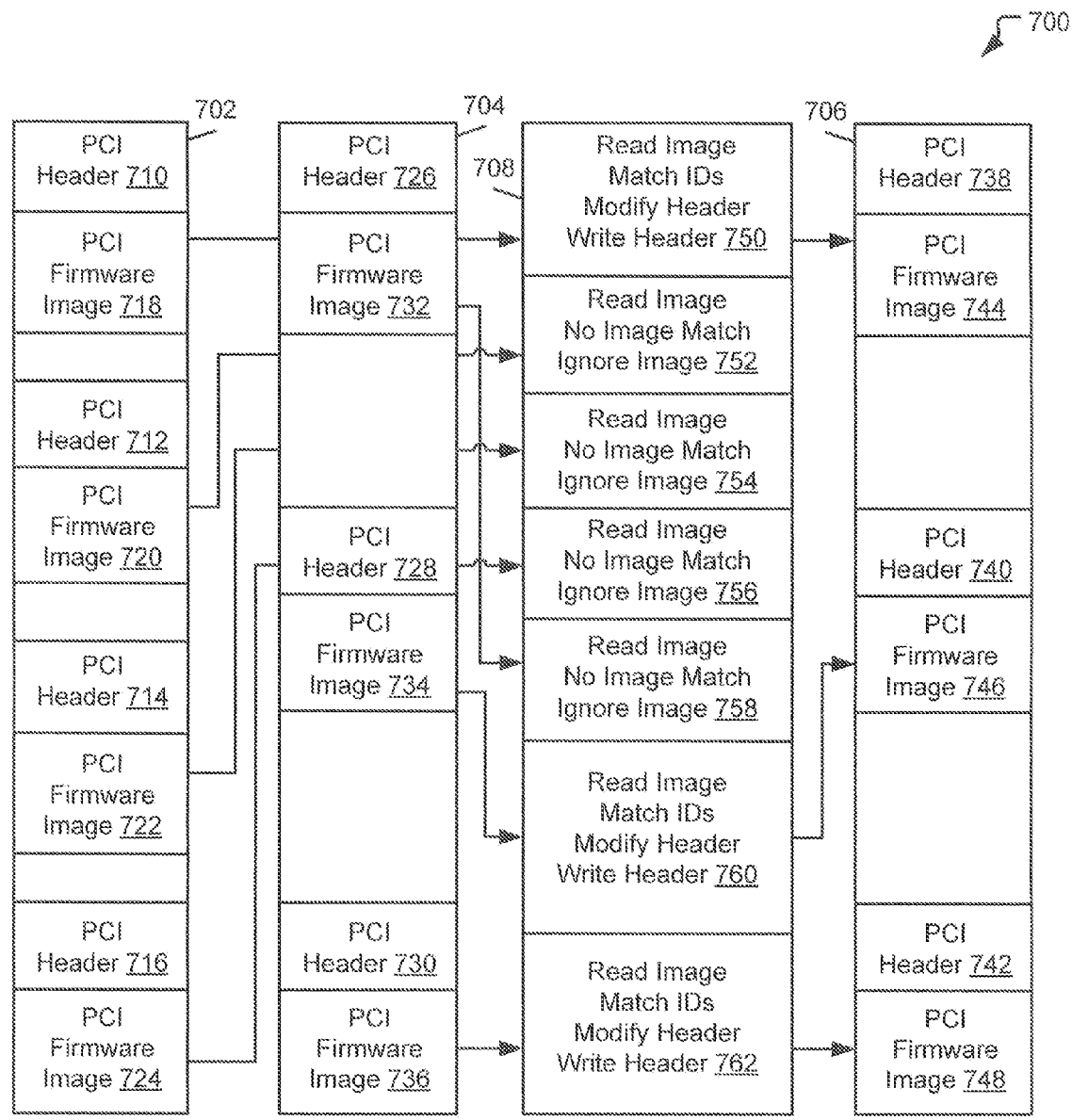
FIG. 7 is a is a block diagram pictorially illustrating an embodiment of a system to virtualize ROM images of different physical functions.

FIG. 7 is a block diagram pictorially illustrating a ROM image virtualization system 700 to process ROM images of different physical functions. An illustrative ROM firmware image, or firmware image, may be configured to enable access to a logical partition. For example, the configuration firmware 612 of the logical partition 602 of FIG. 6 may access and process a firmware image stored the PCI ROMBAR/ROM space 662. As shown in FIG. 7, a first and second physical function expansion ROMs, PF0 Expansion ROM 702 and ROM, PF1 Expansion ROM 704, are mapped or otherwise translated into a virtualized expansion ROM image 706 via PCIM image virtualization processes 708.

As described in greater detail in the flowcharts included herein, the PCIM image virtualization processes 708 may read the PF0 Expansion ROM 702 and the PF1 Expansion ROM 704 to determine and retrieve firmware images that are useful and supported in the virtualized expansion ROM image 706. The virtualized expansion ROM image 706 represents a single image that is created to give a logical partition access to the firmware images of the associated virtual function(s). These firmware images may be used to boot the virtual function. Unnecessary or unsupported data may be filtered out (e.g., not retrieved, or ignored), and the virtualized expansion ROM image 706 may be stored in the virtualization intermediary.

Turning more particularly to FIG. 7, the PF0 Expansion ROM 702 includes PCI header data 710, 712, 714, 716 and PCI firmware images 718, 720, 722, 724. The PF1 Expansion ROM 704 includes PCI header data 726, 728, 730 and PCI firmware images 732, 734, 736. The virtualized expansion ROM image 706 includes PCI header data 738, 740, 742 and PCI firmware images 744, 746, 748.

A PCIM may process data from the PCI firmware image 718 at block 750. For example, the PCIM may match the PCI vendor ID of the physical function with the PCI SR-IOV capability virtual function device ID value or other image ID of the PCI firmware image 718. The PCIM may determine that the architecture of the PCI firmware image 718 is supported by the virtualization intermediary. The PCIM may modify the header data for the virtual function IDs and may write the header data 738 to the virtualized expansion ROM image 706. The PCIM may further write a copy of the PCI firmware image 718 to the virtualized expansion ROM image 706 as the PCI firmware image 744.

The PCIM may additionally process data from the PCI firmware image 720. The PCIM may determine at block 752 that the device ID of the physical function does not match the PCI firmware image 720. The PCIM may consequently ignore the PCI firmware image 720.

Similarly, the PCIM may determine at block 754 that the PCI vendor ID of the physical function associated with the PCI firmware image 722 does not match the device ID value of the physical function. The PCIM may subsequently ignore the PCI firmware image 722.

The PCIM may additionally process data from the PCI firmware image 722. The PCIM may determine at block 756 that the architecture of the PCI firmware image 722 is unsupported by the virtualization intermediary. The PCIM may consequently ignore the PCI firmware image 722. Similarly, the PCIM may determine at block 758 that the architecture of the PCI firmware image 732 is unsupported by the virtualization intermediary. The PCIM may subsequently ignore the PCI firmware image 732.

The PCIM may process data from the PCI firmware image 734 at block 760. For instance, the PCIM may match the PCI vendor ID of the physical function with the PCI SR-IOV capability virtual function device ID value or other image ID of the PCI firmware image 734. The PCIM may determine that the architecture of the PCI firmware image 734 is supported by the virtualization intermediary. The PCIM may modify the header data for the virtual function IDs and may write the header data to the virtualized expansion ROM image 706. The PCIM may further write a copy of the PCI firmware image 734 to the virtualized expansion ROM image 706 as the PCI firmware image 746.

The PCIM may process data from the PCI firmware image 736 at block 762. For example, the PCIM may match the PCI vendor ID of the physical function with the PCI SR-IOV capability virtual function device ID value or other image ID of the PCI firmware image 736. The PCIM may determine that the architecture of the PCI firmware image 736 is supported by the virtualization intermediary. The PCIM may modify the header data for the virtual function IDs and may write the header data to the virtualized expansion ROM image 706. The PCIM may further write a copy of the PCI firmware image 736 to the virtualized expansion ROM image 706 as the PCI firmware image 748.

FIG. 7 thus shows an embodiment PCIM image virtualization processing that selects and formats firmware image data for a virtualized expansion ROM image 706. The virtualized expansion ROM image 706 may be presented to a logical partition to facilitate virtual function boot processes.

Figure 8:
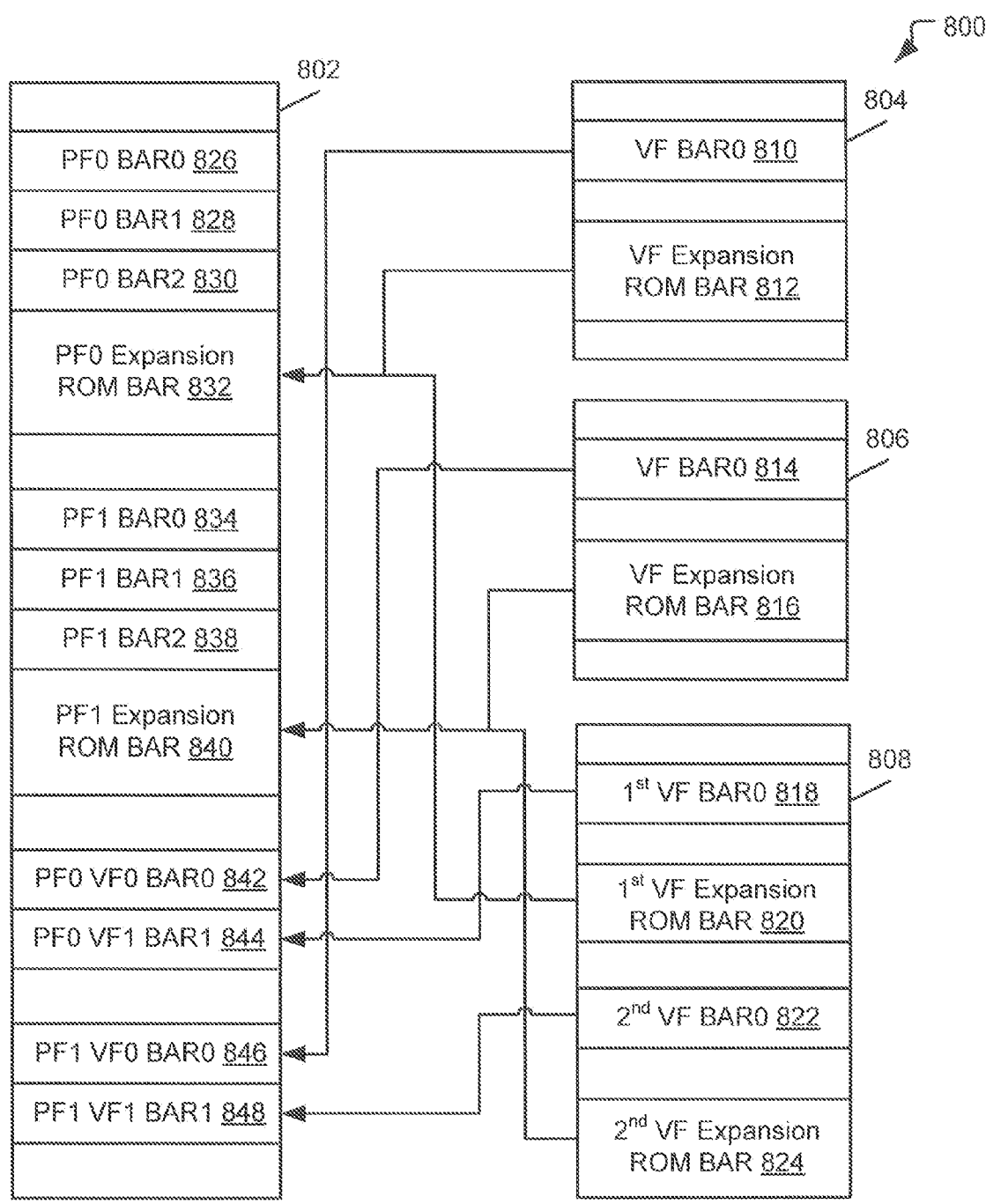
FIG. 8 is a block diagram of an embodiment of a system 800 configured to perform pass-through mapping of logical partition address space into PCI system address space.

FIG. 8 is a block diagram illustrating a system 800 configured to perform pass-through mapping of logical partition address space into PCI system address space. More particularly, the address space 804, 806, 808 of first, second, and third logical partitions may be mapped into PCI system address space 802. According to a particular embodiment, logical partition configuration firmware may use a mapping table to map the logical partition address space into PCI system address space.

The first logical partition address space 804 may be a client of a first physical function (PF0) and a first virtual function (VF0). The second logical partition address space 804 may be a client of a second physical function (PF1) and a second virtual function (VF1). The third logical partition address space 804 may be a client of the first physical function (PF0) and the second virtual function (VF1), as well as of the second physical function (PF1) and the first virtual function (VF0).

The first logical partition address space 804 may include virtual function BAR0 810 and a virtual expansion ROM BAR 812. The second logical partition address space 806 may include virtual function BAR0 814 and a virtual expansion ROM BAR 816. The third logical partition address space 808 may include virtual function BAR0 818 and a virtual expansion ROM BAR 820, as well as virtual function BAR0 822 and a virtual expansion ROMBAR 824.

PCI system address space 802 may include BAR0 826, BAR1 828, BAR2 830, and expansion ROM BAR 832, all associated with a first physical function (PF0). BAR0 834, BAR1 836, BAR2 838, and expansion ROM BAR 840 of the PCI system address space 802 are associated with a second physical function (PF1). The PCI system address space 802 may further include virtual function zero (VF0) BAR0 842 and VF1 BAR0 844, both associated with the first physical function. VF0 BAR0 846 and VF1 BAR1 848 may both be associated with the second physical function.

The virtual function BAR0 810 may be mapped to the PF1 VF0 BAR0 846, and the virtual function expansion ROM BAR0 812 may be mapped to the PF0 expansion ROM BAR0 832. The virtual function BAR0 814 may be mapped to the PF0 VF0 BAR0 842, and the virtual expansion ROM BAR 816 may be mapped to the expansion ROM BAR 840 of the second physical function. The virtual function BAR0 818 may be mapped to the VF1 BAR0 844, and the virtual expansion ROM BAR 820 may be mapped to the expansion ROM BAR 832. The virtual function BAR0 822 may be mapped to the VF1 BAR1 848, and the virtual expansion ROMBAR 824 may be mapped to the expansion ROM BAR 840 of the second physical function.

Figure 9:
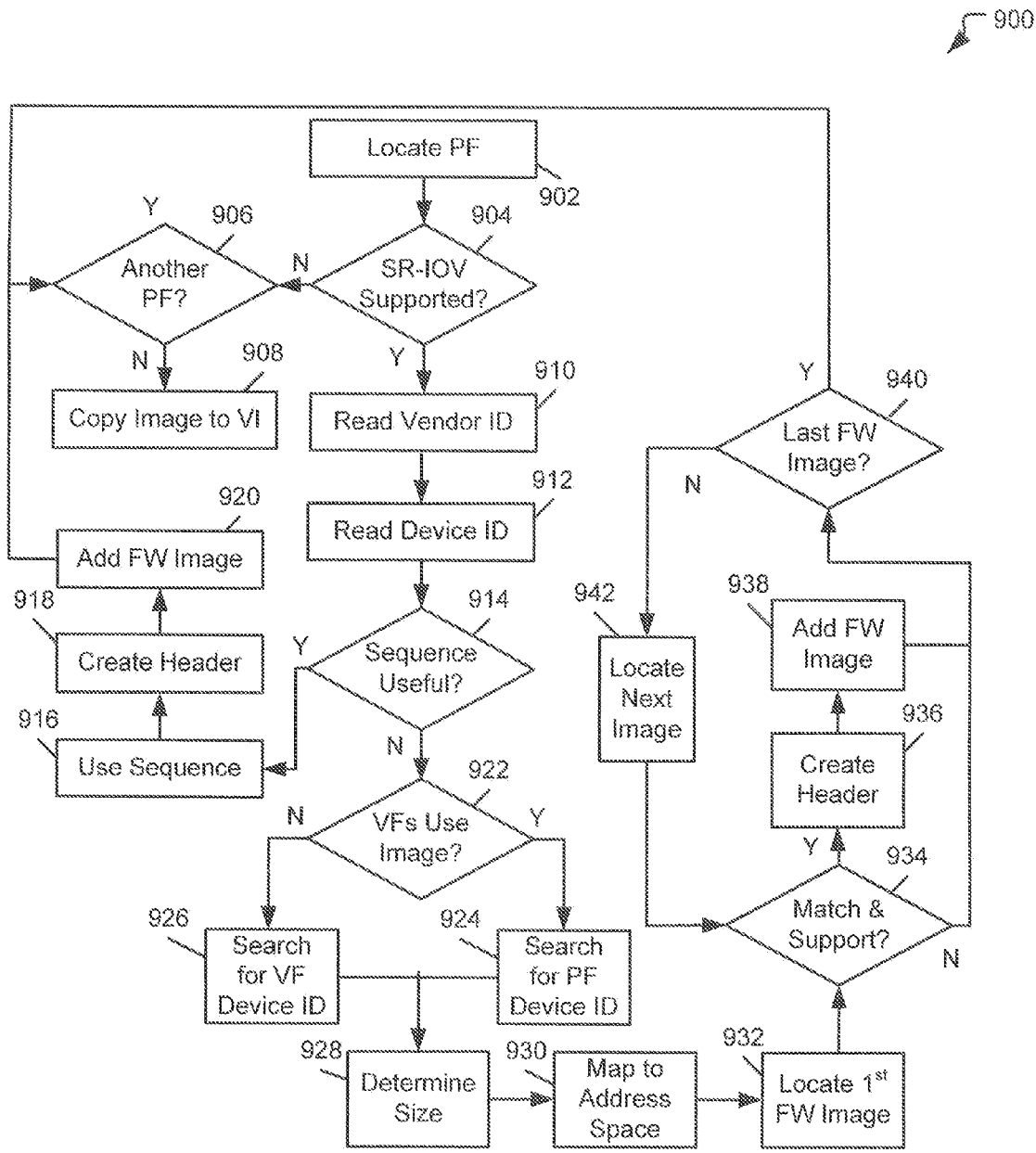
FIG. 9 is a flow diagram of an embodiment of a method of a PCIM image virtualization process that maps or otherwise translates a ROM image of a physical function of an I/O adapter into a virtualized expansion ROM firmware image.

FIG. 9 is a flowchart of an embodiment of a method 900 of a PCIM image virtualization process that maps or otherwise translates a ROM image of a physical function of an I/O adapter into a virtualized expansion ROM image. An embodiment of the method 900 may be executed by a PCIM, or a physical function manager, of a logically portioned computing system, such as the system 700 of FIG. 7.

Turning more particularly to the flowchart, a first physical function of an adapter may be located at 902. A system of an embodiment may determine at 904 whether a physical function supports SR-IOV. Where the physical function does not support SR-IOV at 904, the system may determine at 906 whether another physical function is associated with the adapter. Where there is not another physical function at 906, a virtual expansion ROM image may be assembled and/or copied at 908 from the PCIM to the virtualization intermediary. Where another physical function is alternatively located at 906, a next physical function may be located at 902.

Where the physical function at 904 alternatively supports SR-IOV, the PCI vendor ID value of the physical function may be read at 910. The read PCI vendor ID value may be used for the physical function's virtual functions vendor ID. At 912, the PCI SR-IOV capability virtual function device ID value of the physical function may be read.

The system may determine at 914 whether a vendor specific sequence is useful or needed to retrieve a firmware image(s) for the virtual functions of the physical function. Where so, the vendor specific sequence may be used at 916 to retrieve the firmware image(s) for the virtual functions of the physical function. A PCI header may be created at 918 to match the virtual function IDs and all possible virtual function classes. The firmware image with the header may be added at 920 to the virtual expansion ROM image in memory, and the system may attempt to locate another physical function at 906.

Where the a vendor specific sequence is not useful or needed to retrieve the firmware image(s) at 914, the system may determine at 922 whether the virtual functions of the physical function use the firmware image(s) of the physical function. The firmware images may be identified by the vendor ID and/or device ID of the physical function. Where the virtual functions use the firmware image(s) of the physical function, the system at 924 may search for the device ID of the physical function in the expansion ROM of the physical function. Where the virtual functions alternatively do not use the firmware image(s) of the physical function at 922, the system at 926 may search for the virtual function device ID. The virtual function device ID may be determined from the PCI SR-IOV capability in the expansion ROM of the physical function.

At 928, the system may determine the size of the PCI expansion ROM BAR of the physical function. The PCI expansion ROM BAR of the physical function may be mapped at 930 into PCI and processor address space. The first firmware image, along with its associated PCI data structure and header of the expansion ROM, may be located at 932.

The system may determine at 934 whether the located device ID match the header data. The system may further determine whether the architecture of the firmware image is supported by the virtualization intermediary. Where the device ID matches and the architecture is supported at 934, a PCI header may be created at 936 to match the virtual function device IDs. A class type may be copied from the original header. The firmware image may be added at 938 to the virtual expansion ROM image in the memory.

The system at 940 may determine whether the last PCI firmware image has been encountered. Where there is another PCI firmware image at 940, the next firmware image of the expansion ROM may be located at 942, along with its PCI data structure and header. Otherwise, the system processes may return at 906 to locate a next physical function.

Figure 10:
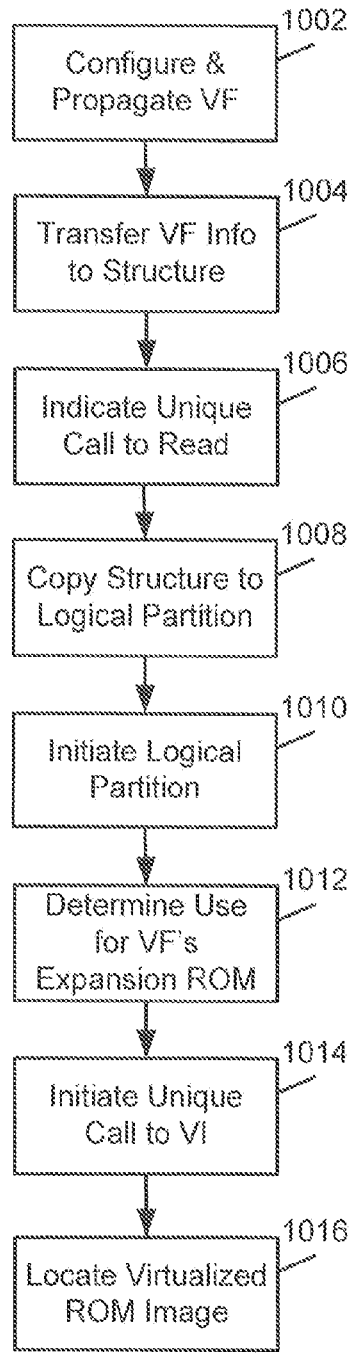
FIG. 10 is a flow diagram of an embodiment of a method executed to virtualize an expansion ROM firmware image.

FIG. 10 is a flowchart of another embodiment of a method 1,000 of a PCIM image virtualization process that maps or otherwise translates a ROM image of a physical function of an I/O adapter into a virtualized expansion ROM image. At 1,002, the PCIM may configure the virtual function. The PCIM may further propagate the configuration of the virtual function to the virtualization intermediary. The virtualization intermediary may place or otherwise transfer the virtual function configuration information at 1,004 into a structure for use by the configuration firmware, or logical partition firmware.

The virtualization intermediary may indicate at 1,006 that the virtual function may use a unique call to the virtualization intermediary to read the expansion ROM of the device. The virtualization intermediary may copy at 1,008 the structure to the memory of the logical partition for the configuration firmware. The virtualization intermediary may initiate at 1,010 the logical partition that owns the virtual function.

The configuration firmware may determine at 1,012 that it may use the expansion ROM of the virtual function. The configuration firmware may use at 1,014 the unique virtualization intermediary call to read the expansion ROM for the virtual function. In response, the virtualization intermediary may locate at 1,016 the virtualized expansion ROM image for the virtual function device and may return appropriate data.

Figure 11:
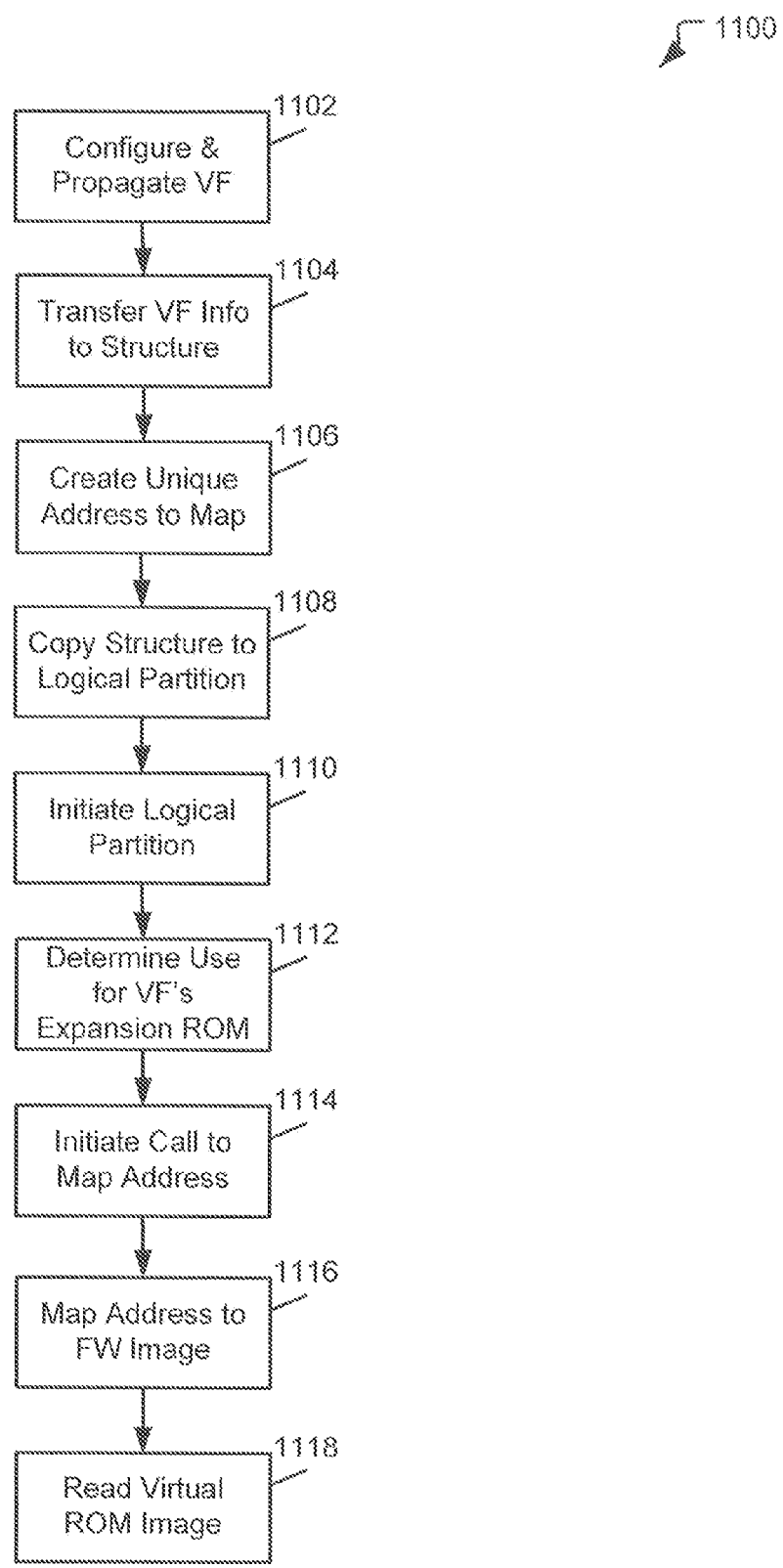
FIG. 11 is a flow diagram of another embodiment of a method of processing an expansion ROM firmware image.

FIG. 11 is a flowchart of another embodiment of a method 1,100 of a PCIM image virtualization to map a ROM image of a physical function of an I/O adapter into a virtualized expansion ROM image. At 1,102, the PCIM may configure the virtual function. The PCIM may further propagate the configuration of the virtual function to the virtualization intermediary. The virtualization intermediary may place or otherwise transfer the virtual function configuration information at 1,104 into a structure for use by the configuration firmware, or logical partition firmware.

The virtualization intermediary may create at 1,106 a unique address for the virtual expansion ROM image. The logical partition may use the virtual expansion ROM image for memory mapping. The virtualization intermediary may copy at 1,108 the structure to the memory of the logical partition for the configuration firmware. The virtualization intermediary may initiate at 1,110 the logical partition that owns the virtual function.

The configuration firmware may determine at 1,112 that it may use the expansion ROM of the virtual function. The configuration firmware may call the virtualization intermediary at 1,114 to map the firmware image address. In response, the virtualization intermediary may map at 1,016 the input address from the logical partition/configuration firmware to the firmware image in the virtualization intermediary memory. The configuration firmware may read the virtual expansion ROM image at 1,118 directly using address mapping to the virtualization intermediary memory.

Figure 12:
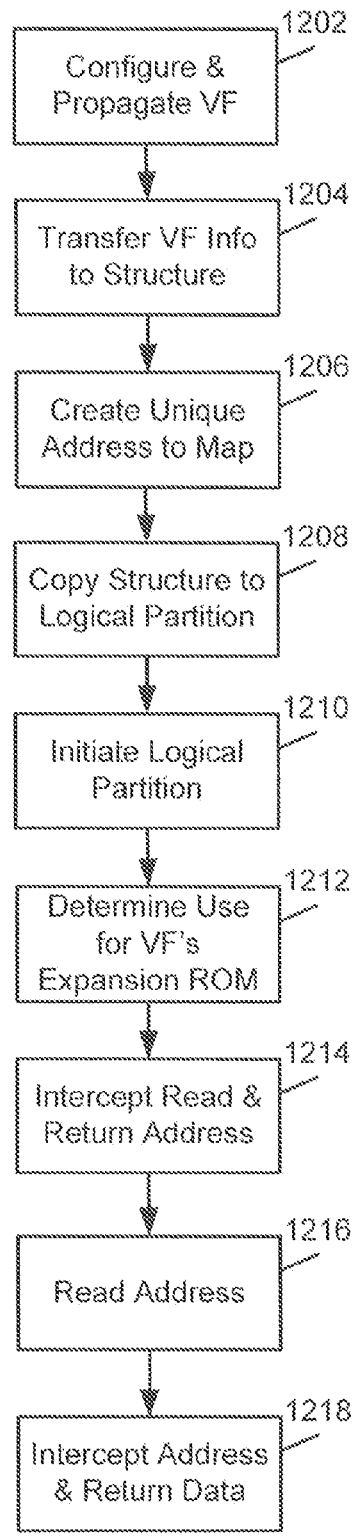
FIG. 12 is a flow diagram of a method of performing expansion ROM firmware image virtualization.

FIG. 12 is a flowchart of another embodiment of a method 1,200 of a PCIM image virtualization to map a ROM image of a physical function of an I/O adapter into a virtualized expansion ROM image. At 1,202, the PCIM may configure the virtual function. The PCIM may further propagate the configuration of the virtual function to the virtualization intermediary. The virtualization intermediary may place or otherwise transfer the virtual function configuration information at 1,204 into a structure for use by the configuration firmware, or logical partition firmware.

The virtualization intermediary may create at 1,206 a unique address for the virtual expansion ROM image. The logical partition may use the virtual expansion ROM image for memory mapping. The virtualization intermediary may copy at 1,208 the structure to the memory of the logical partition for the configuration firmware. The virtualization intermediary may initiate at 1,210 the logical partition that owns the virtual function.

The configuration firmware may determine at 1,212 that it may use the expansion ROM of the virtual function. The configuration firmware may read at 1,214 the expansion ROM BAR. The virtualization intermediary may intercept the expansion ROM BAR and may return the unique address (i.e., created at 1,206).

At 1,216, the configuration firmware may use a virtualization intermediary call to read from the unique I/O address. The virtualization intermediary may intercept the address at 1,218 and may return appropriate data from the virtual expansion ROM image in the virtualization intermediary memory.

Figure 13:
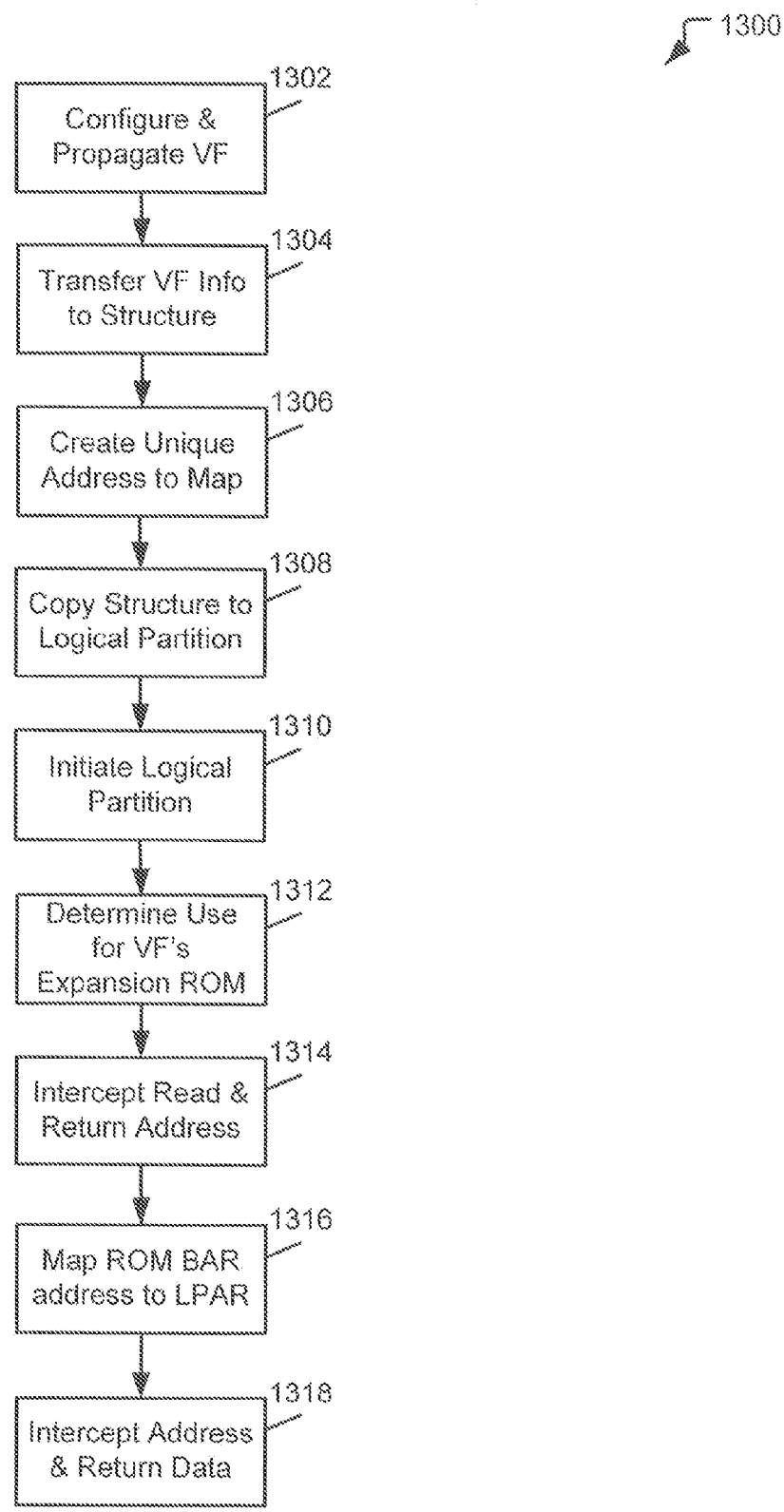
FIG. 13 is a flow diagram of another embodiment of a method of virtualizing an expansion ROM firmware image.

FIG. 13 is a flowchart of another embodiment of a method 1,300 of a PCIM image virtualization to map a ROM image of a physical function of an I/O adapter into a virtualized expansion ROM image. At 1,302, the PCIM may configure the virtual function. The PCIM may further propagate the configuration of the virtual function to the virtualization intermediary. The virtualization intermediary may place or otherwise transfer the virtual function configuration information at 1,304 into a structure for use by the configuration firmware, or logical partition firmware.

The virtualization intermediary may create at 1,306 a unique address for the virtual expansion ROM image. The logical partition may use the virtual expansion ROM image for memory mapping. The virtualization intermediary may copy at 1,308 the structure to the memory of the logical partition for the configuration firmware. The virtualization intermediary may initiate at 1,310 the logical partition that owns the virtual function.

The configuration firmware may determine at 1,312 that it may use the expansion ROM of the virtual function. The configuration firmware may read at 1,314 the expansion ROM BAR. The virtualization intermediary may intercept the expansion ROM BAR and may return the unique I/O address (i.e., created at 1,306).

At 1,316, the configuration firmware may use a virtualization intermediary call to map the expansion ROM BAR address to the logical partition address. The virtualization intermediary may intercept mapping call with the ROM BAR address at 1,318. The virtualization intermediary may further map the logical partition address to image in the virtual expansion ROM image in the virtualization intermediary memory.

Figure 14:
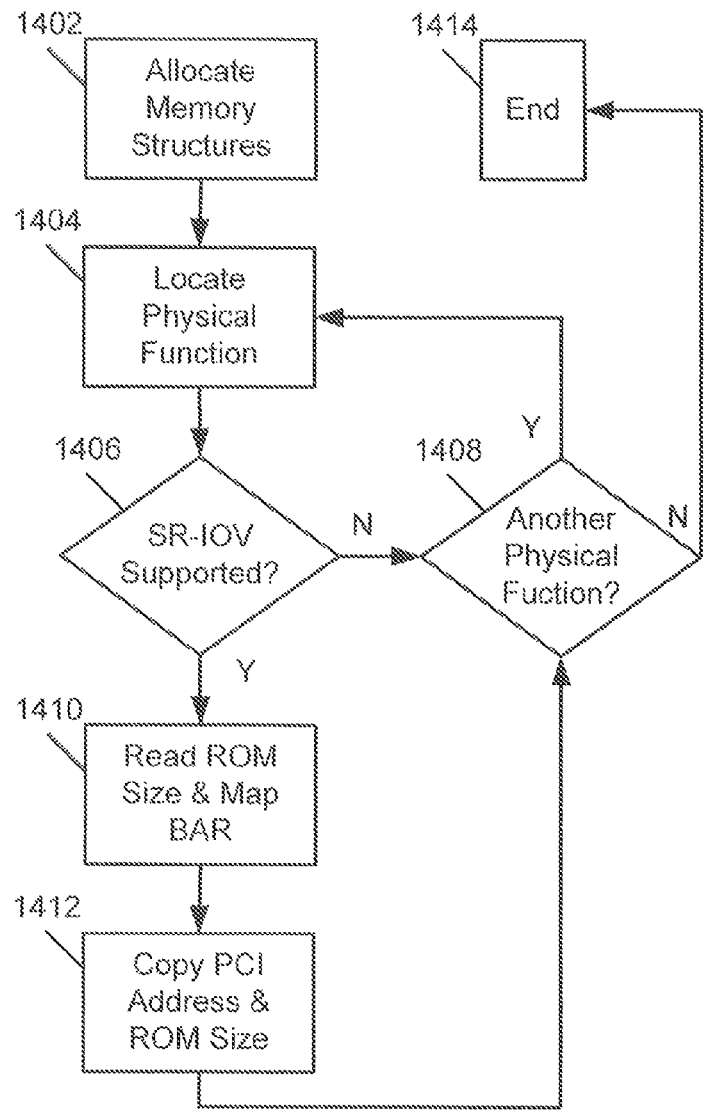
FIG. 14 is a flow diagram of an embodiment of a method of enabling a logical partition to access an expansion ROM firmware image.

FIG. 14 is a flowchart of an embodiment of a method 1,400 of a PCIM image virtualization process that maps or otherwise translates a ROM image of a physical function of an I/O adapter into a virtualized expansion ROM image. An embodiment of the method 1,400 may be executed as a pass-through operation by a PCIM, or a physical function manager, of a logically portioned computing system, such as the system 800 of FIG. 8.

Turning more particularly to the flowchart, the PCIM may allocate memory structures at 1,402. The memory structures may be useful to hold a firmware image(s). A first physical function may be located at 1,404. The PCIM may determine at 1,406 whether a located physical function supports SR-IOV. Where the physical function does not support SR-IOV, the PCIM may attempt to locate another physical function at 1,404. Where another physical function cannot be located, the method 1,400 may end at 1,414.

Where the physical function alternatively does support SR-IOV at 1,406, the PCIM may read at 1,410 the expansion ROM of the physical function size and may map the BAR into the PCI address space. The PCI address and the size of the expansion ROM of the physical function may be copied to the virtualization intermediary at 1,412. The system may determine at 1,408 whether there is another physical function.

Figure 15:
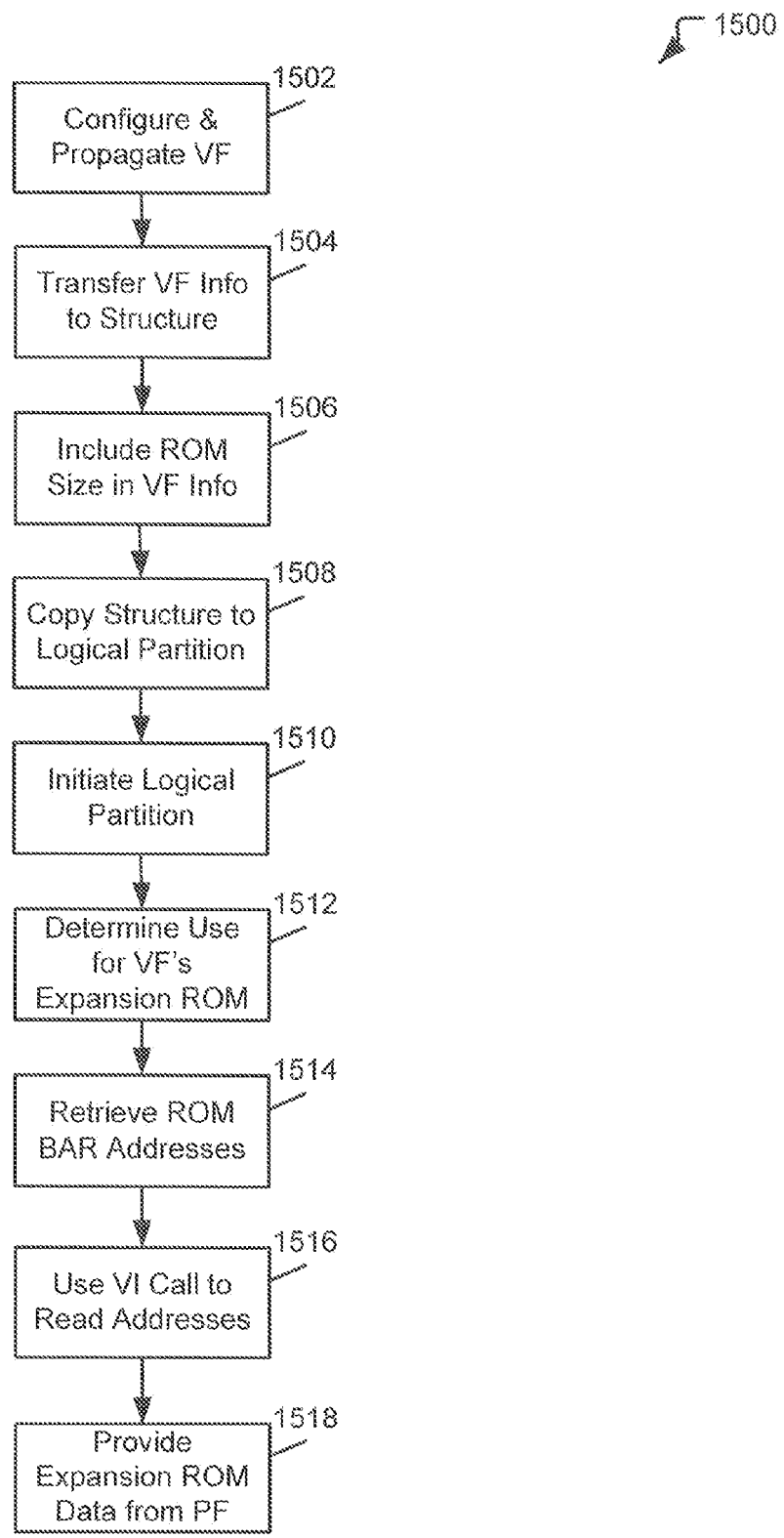
FIG. 15 is a flow diagram of another embodiment of a method of presenting an expansion ROM firmware image.

FIG. 15 is a flowchart of an embodiment of a method 1,500 of a PCIM image virtualization to map a ROM image of a physical function of an I/O adapter into a virtualized expansion ROM image. At 1,502, the PCIM may configure the virtual function. The PCIM may further propagate the configuration of the virtual function to the virtualization intermediary. The virtualization intermediary may place or otherwise transfer the virtual function configuration information at 1,504 into a structure for use by the configuration firmware, or logical partition firmware.

The virtualization intermediary may input at 1,506 a matching physical function expansion ROM size of the virtual function (e.g., from the PCIM) to a structure, along with the virtual function configuration information. The virtualization intermediary may copy at 1,508 the structure to the memory of the logical partition for the configuration firmware. The virtualization intermediary may initiate at 1,510 the logical partition that owns the virtual function.

The configuration firmware may determine at 1,512 that it may use the expansion ROM of the virtual function. The configuration firmware may retrieve at 1,514 the expansion ROM BAR address of the virtual function. The configuration firmware may retrieve the address information from the data structure provided by the virtualization intermediary.

At 1,516, the configuration firmware may use a virtualization intermediary call to read the expansion ROM BAR address. The physical function (e.g., in the adapter) may respond at 1,518 to the read(s) with data from the expansion ROM of the physical function.

Figure 16:
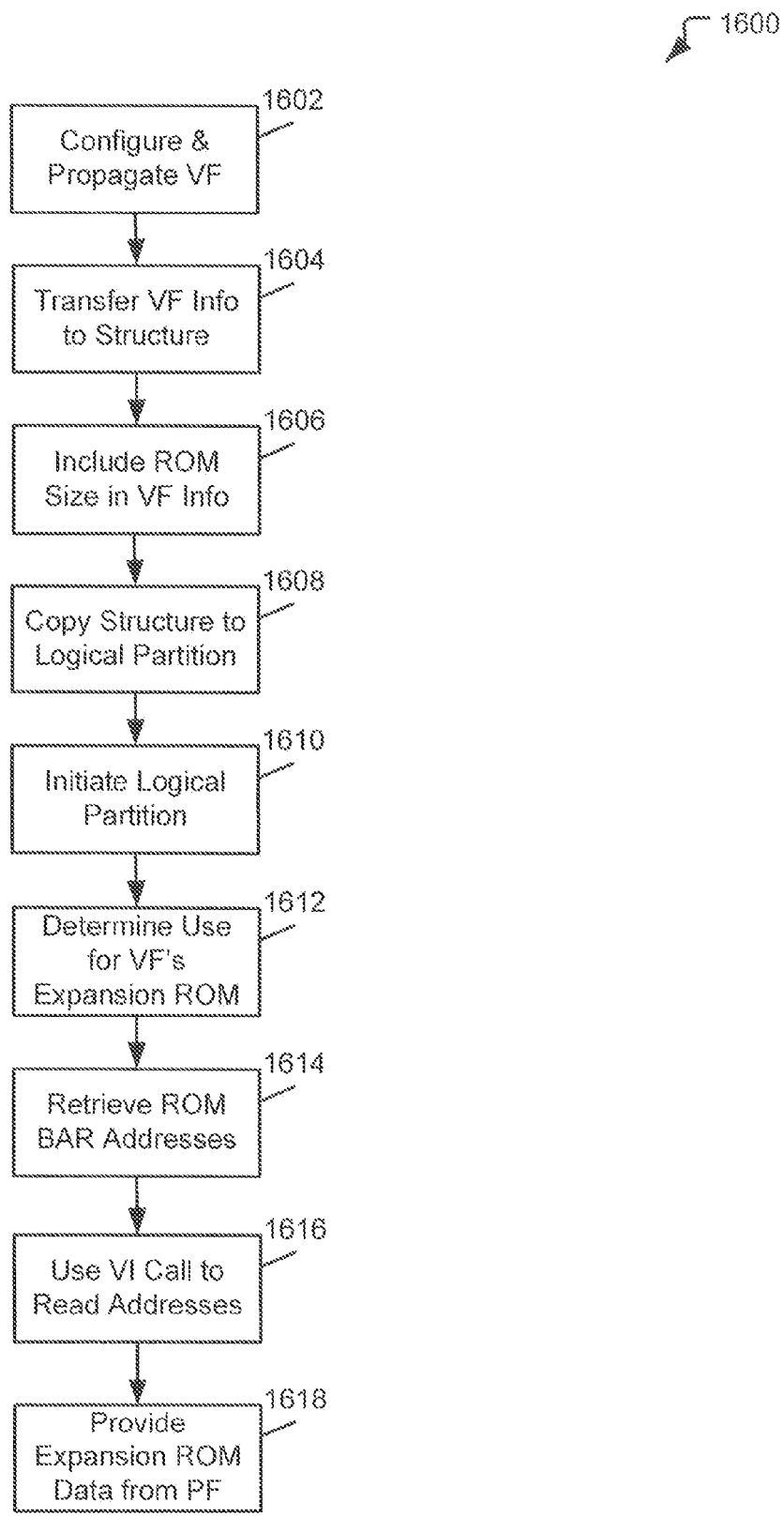
FIG. 16 is a flow diagram of another embodiment of a method of virtualizing an expansion ROM firmware image.

FIG. 16 is a flowchart of another embodiment of a method 1,600 of a PCIM image virtualization to map a ROM image of a physical function of an I/O adapter into a virtualized expansion ROM image. At 1,602, the PCIM may configure the virtual function and may further propagate the configuration of the virtual function to the virtualization intermediary. The virtualization intermediary may place or otherwise transfer the virtual function configuration information at 1,604 into a structure for use by the configuration firmware, or logical partition firmware.

The virtualization intermediary may input at 1,606 a size of the physical function expansion ROM of the virtual function into the data structure, along with the virtual function configuration information. The virtualization intermediary may copy at 1,608 the structure to the memory of the logical partition for the configuration firmware. The virtualization intermediary may initiate at 1,610 the logical partition that owns the virtual function.

The configuration firmware may determine at 1,612 that it may use the expansion ROM of the virtual function. The configuration firmware may read at 1,614 the address from the expansion ROM BAR. The configuration firmware may additionally read or otherwise retrieve the size data from the virtual function configuration information structure. The structure may be stored at the virtualization intermediary.

At 1,616, the configuration firmware may use a virtualization intermediary call to map the expansion ROM BAR address to the logical partition address. The configuration firmware may read at 1,618 from the region mapped with the expansion ROM BAR address.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read-only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Use of the terms Peripheral Component Interconnect Express (PCIe) and Peripheral Component Interconnect (PCI) may be used interchangeably in some instances. Moreover, the terms operating system and logical partition may be used interchangeably in certain of the embodiments described herein. Various modifications to these embodiments, including embodiments of I/O adapters virtualized in multi-root input/output virtualization (MR-IOV) embodiments, or virtualized using software virtualization intermediaries, will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method of managing an adapter in a data processing system, the method comprising:
   reading at least one firmware image of a physical function stored in an expansion read-only memory (ROM) of the adapter, wherein the adapter is single root input/output virtualization (SR-IOV) capable;
   determining that the at least one firmware image corresponds to a virtual function that is associated with a virtual function identifier (ID) and the adapter;
   creating a virtualized expansion ROM image corresponding to the expansion ROM in the adapter using the at least one firmware image;
   using a virtualization intermediary to enable access to the virtualized expansion ROM image by a logical partition of the data processing system;
   reading vendor identification data of a second physical function stored in the expansion ROM of the adapter;
   determining whether the vendor identification data is used to retrieve a second firmware image of the second physical function;
   in response to determining that the vendor identification data is not used, determining whether a second virtual function of the second physical function uses the second firmware image; and
   in response to determining that the second firmware image is not used, searching for a second virtual ID associated with the second virtual function in the expansion ROM of the adapter.

2. The method of claim 1, further comprising providing at least one of a size or an address associated with the at least one firmware image to the logical partition.

3. The method of claim 2, further comprising mapping the address of the at least one firmware image into memory space of the logical partition.

4. The method of claim 1, further comprising determining that a virtualization intermediary call is to be generated based on the virtualization intermediary enabling access to the virtualized expansion ROM image.

5. The method of claim 4, further comprising generating the virtualization intermediary call to enable the logical partition to read the at least one firmware image.

6. The method of claim 4, wherein the virtualization intermediary call enables the logical partition to determine a size of the at least one firmware image without using an address of the at least one firmware image.

7. The method of claim 1, further comprising creating a first memory-mapped input/output (MMIO) region corresponding to the expansion ROM and creating a second MMIO region corresponding to the virtualized expansion ROM image.

8. The method of claim 1, further comprising associating a port of the adapter with the virtualized expansion ROM image.

9. The method of claim 8, further comprising filtering out a portion of the at least one firmware image.

10. The method of claim 1, further comprising locating the physical function associated with the adapter.

11. The method of claim 10, further comprising determining whether the physical function is single root input/output virtualization (SR-IOV) capable.

12. The method of claim 1, further comprising allocating memory to store the virtualized expansion ROM image.

13. The method of claim 1, further comprising copying the at least one firmware image from a physical function manager to the virtualization intermediary.

14. The method of claim 1, wherein the virtual function associated with the adapter includes a boot operation.

15. An apparatus, comprising:
an adapter;
a processor;
a memory storing program code, the program code executable by the processor to:
read at least one firmware image of a physical function stored in an expansion read-only memory (ROM) of the adapter, wherein the adapter is single root input/output virtualization (SR-IOV) capable;
determine that the at least one firmware image corresponds to a virtual function that is associated with a virtual function identifier (ID) and the adapter;
create a virtualized expansion ROM image corresponding to the expansion ROM in the adapter using the at least one firmware image;
using a virtualization intermediary to enable access to the virtualized expansion ROM image by a logical partition;
reading vendor identification data of a second physical function stored in the expansion ROM of the adapter;
determining whether the vendor identification data is used to retrieve a second firmware image of the second physical function;
in response to determining that the vendor identification data is not used, determining whether a second virtual function of the second physical function uses the second firmware image; and
in response to determining that the second firmware image is not used, searching for a second virtual ID associated with the second virtual function in the expansion ROM of the adapter.

16. The apparatus of claim 15, wherein the virtual function is assigned to an operating system image of a plurality of operating system images.

17. The apparatus of claim 15, wherein the program code is executable to provide at least one of a size or an address associated with the at least one firmware image to the logical partition.

18. A computer program product of a data processing system comprising:
a computer usable storage device storing computer usable program code executable by a processor to:
read at least one firmware image of a physical function that is stored in an expansion read-only memory (ROM) of an adapter, wherein the adapter is single root input/output virtualization (SR-IOV) capable;
determine that the at least one firmware image corresponds to a virtual function that is associated with a virtual function identifier (ID) and the adapter;
create a virtualized expansion ROM image corresponding to the expansion ROM in the adapter using the at least one firmware image;
use a virtualization intermediary of the data processing system to enable access to the virtualized expansion ROM image by a logical partition;
storing the virtualized expansion ROM image in the virtualization intermediary;
generating a header corresponding to the virtual function ID;
storing the header and the at least one firmware image in connection with the virtualized expansion ROM image;
accessing the at least one firmware image via the virtualization intermediary;
reading a second firmware image of a second physical function stored in the expansion ROM of the adapter;
determining that the second firmware image corresponds to a second virtual function associated with the adapter;
generating a second header corresponding to a second virtual function ID that is associated with the second virtual function; and
storing the second header and the second firmware image in connection with the virtualized expansion ROM image to enable access to the second virtual function by a second logical partition.

19. The method of claim 1, wherein a first number of firmware images associated with the virtualized expansion ROM image is less than a second number of firmware images associated with the expansion ROM.

20. The apparatus of claim 15, wherein the program code is executable to allocate memory to store the virtualized expansion ROM image.

21. The apparatus of claim 15, wherein the program code is executable to copy the at least one firmware image from a physical function manager to the virtualization intermediary.

22. The apparatus of claim 15, wherein the program code is executable to associate a port of the adapter with the virtualized expansion ROM image.

* * * * *